(12) United States Patent
Deshpande et al.

(10) Patent No.: US 6,601,062 B1
(45) Date of Patent: Jul. 29, 2003

(54) ACTIVE CACHING FOR MULTI-DIMENSIONAL DATA SETS IN RELATIONAL DATABASE MANAGEMENT SYSTEM

(75) Inventors: Prasad Manikarao Deshpande, Madison, WI (US); Karthikeyan Ramasamy, Madison, WI (US); Amit Shukla, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 281 days.

(21) Appl. No.: 09/605,208

(22) Filed: Jun. 27, 2000

(51) Int. Cl.[7] ............................................. G06F 17/30
(52) U.S. Cl. .......................... 707/3; 707/100; 711/118
(58) Field of Search ................... 707/2, 3, 4, 5, 707/100; 711/118

(56) References Cited

U.S. PATENT DOCUMENTS

| | | | |
|---|---|---|---|
| 5,794,229 A | 8/1998 | French et al. | 707/2 |
| 5,832,475 A | 11/1998 | Agrawal et al. | 707/2 |
| 5,905,985 A * | 5/1999 | Malloy et al. | 707/100 |
| 5,918,225 A | 6/1999 | White et al. | 707/3 |
| 5,918,232 A * | 6/1999 | Pouschine et al. | 707/103 R |
| 5,943,677 A | 8/1999 | Hicks | 707/205 |
| 6,003,036 A | 12/1999 | Martin | 707/102 |
| 6,134,541 A | 10/2000 | Castelli et al. | 707/2 |
| 6,154,746 A * | 11/2000 | Berchtold et al. | 707/100 |
| 6,275,818 B1 | 8/2001 | Subramanian et al. | 707/2 |
| 6,289,352 B1 | 9/2001 | Proctor | 707/102 |
| 6,317,750 B1 | 11/2001 | Tortolani et al. | 707/103 R |
| 6,381,605 B1 | 4/2002 | Kothuri et al. | 707/100 |
| 6,424,972 B1 | 7/2002 | Berger et al. | 707/101 |
| 6,434,544 B1 * | 8/2002 | Bakalash et al. | 707/2 |

OTHER PUBLICATIONS

Deshpande et al. "Caching Multidimensional Queries Using Chunks", Proc. of ACM SIGMOD Int. Conf. on Mgmt. of Data, 1998, pp. 259–270.*

DeWitt et al., "Client–Server Paradise," Proceedings of the 20th VLDB Conference, 1994, pp. 1–12.

Kabra et al., "OPT++: an Object–Oriented Implementation for Extensible Database Query Optimization," VLDB Journal, 1999, pp. 55–78.

S. Dar, M.J. Franklin, B.T. Jonsson, D. Srivastava, M. Tan, "Semantic Data Caching and Replacement," Proc. of the 22nd Int. VLDB Conf., 1996, pp. 330–341.

P.M. Desphpande, K. Ramasamy, A. Shukla, J.F. Naughton, "Caching Multidimensional Queries Using Chunks," Proc. of ACM SIGMOD Int. Conf. on Mgmt. of Data, 1998, 259–270.

A. Shukla, P.M. Deshpande, J.F. Naughton, J. Ramasamy, "Storage Estimation for Multidimensional Aggregates in the Presence of Hierarchies," Proc. of the 22nd Int. VLDB Conf., 1996, 522–531.

A. Shukla, P.M. Deshpande, J.F. Naughton, "Materialized View Selection for Multidimensional Datasets," Proc. of the 24th Int. VLDB Conf., 1998, 488–499.

Y. Zhao, P.M. Deshpande, J.F. Naughton, "An Array–Based Algorithm for Simultaneous Multidimensional Aggregates," Proc. ACM SIGMOD Int. Conf. on Management of Data, 1997, 159–170.

* cited by examiner

Primary Examiner—John Breene
Assistant Examiner—Cheryl Lewis
(74) Attorney, Agent, or Firm—Gates & Cooper

(57) ABSTRACT

An "active cache", for use by On-Line Analytic Processing (OLAP) systems, that can not only answer queries that match data stored in the cache, but can also answer queries that require aggregation or other computation of the data stored in the cache.

15 Claims, 15 Drawing Sheets

PRODUCT / TIME

TIME

| DIMENSION | LEVELS |
|---|---|
| A | $A_1, A_0$ = ALL |
| B | $B_2, B_1, B_0$ = ALL |
| C | $C_1, C_0$ = ALL |
FIG. 5
FIG. 6
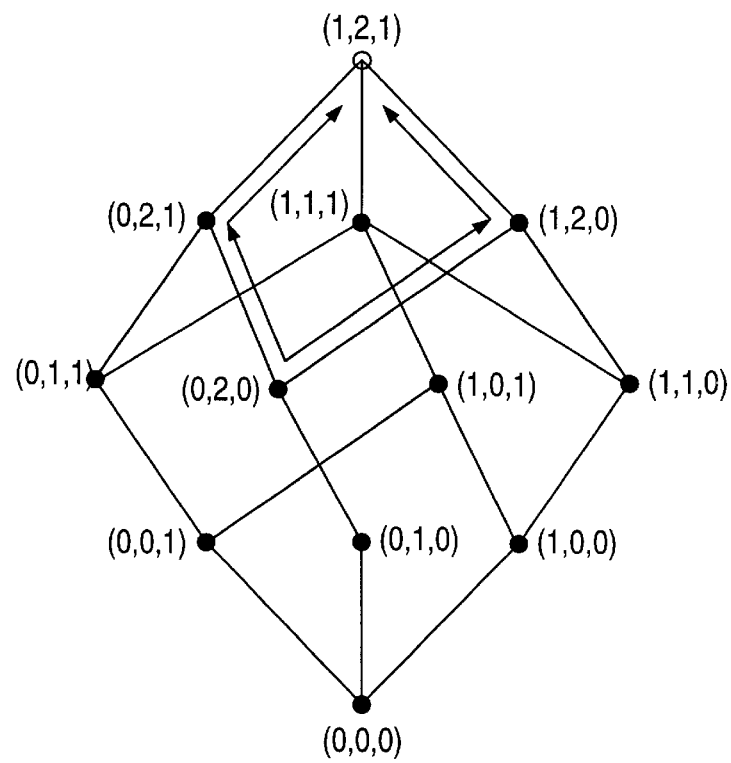
FIG. 12
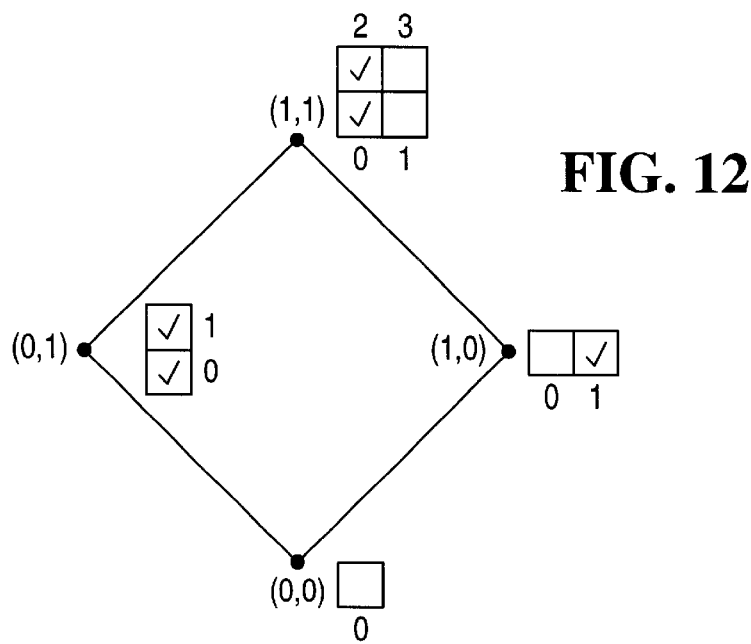

ACTIVE CACHING FOR MULTI-DIMENSIONAL DATA SETS IN RELATIONAL DATABASE MANAGEMENT SYSTEM

CROSS REFERENCE TO RELATED APPLICATIONS

This application is related to the following co-pending and commonly assigned patent applications, all of which are incorporated by reference herein:

application Ser. No. 09/605,203, entitled "METHOD FOR DETERMINING THE COMPUTABILITY OF DATA FOR AN ACTIVE MULTI-DIMENSIONAL CACHE IN A RELATIONAL DATABASE MANAGEMENT SYSTEM," filed on same date herewith, pending, by Prasad M. Deshpande, Karthikeyan Ramasamy, Amit Shukla, and Jeffrey F. Naughton;

application Ser. No. 09/474,040, entitled "METHOD AND APPARATUS FOR EVALUATING INDEX PREDICATES ON COMPLEX DATA TYPES USING VIRTUAL INDEXED STREAMS" filed on Dec. 28, 1999, pending, by Jignesh M. Patel and Navin Kabra;

application Ser. No. 09/470,228, U.S. Pat. No. 6,477,540, entitled "METHOD AND APPARATUS FOR USING JAVA AS A STORED PROCEDURE LANGUAGE AND AS AN EMBEDDED LANGUAGE ON A CLIENT" filed on Dec. 22, 1999, by Ashutish Singh, Jignesh M. Patel, and Navin Kabra;

application Ser. No. 09/470,228, entitled "METHOD AND APPARATUS FOR PARALLEL EXECUTION OF TRIGGER ACTIONS" filed on Dec. 22, 1999, pending, by Navin Kabra, Jignesh M. Patel, Jie-Bing Yu, Biswadeep Nag, and Jian-Jun Chen;

application Ser. No. 09/470,215, entitled "METHOD AND APPARATUS FOR PARALLEL EXECUTION OF SQL FROM WITHIN USER DEFINED FUNCTIONS" filed on Dec. 22, 1999, pending, by Navin Kabra, Jignesh Patel, Jie-Bing Yu, Biswadeep Nag, and Jian-Jun Chen;

application Ser. No. 09/470,927, U.S. Pat. No. 6,507,834, entitled "METHOD AND APPARATUS FOR PARALLEL EXECUTION OF SQL FROM STORED PROCEDURES", filed on Dec. 22, 1999, by Navin Kabra, Jignesh Patel, Jie-Bing Yu, Biswadeep Nag, and Jian-Jun Chen;

application Ser. No. 09/449,704, entitled "METHOD AND APPARATUS FOR FETCHING ARRAY BASED OBJECTS BY DIRECT DELIVERY AND BATCHING" filed on Nov. 24, 1999, pending, by Biswadeep Nag, Jie-Bing Yu, Jignesh M. Patel, and Zhe Wang; and application Ser. No. 09/449,085, entitled "QUERY MONITOR PLAYBACK MECHANISM FOR POST-MORTEM PERFORMANCE ANALYSIS" filed on Nov. 24, 1999, pending, by Karthikeyan Ramasamy, Jie-Bing Yu, and Jun Li.

BACKGROUND OF THE INVENTION

1. Field of the Invention

This invention relates in general to database management systems performed by computers, and in particular, to an active cache approach to caching multi-dimensional data sets for an on-line analytical processing (OLAP) system that uses a relational database management system (RDBMS).

2. Description of Related Art (Note: This application references a number of different publications as indicated throughout the specification by reference numbers enclosed in brackets, e.g., [x]. A list of these different publications ordered according to these reference numbers can be found in the "Detailed Description of the Preferred Embodiment" in Section 9 entitled "References." Each of these publications is incorporated by reference herein.)

On-Line Analytical Processing (OLAP) systems provide tools for analysis of multi-dimensional data. Most systems are built using a three-tier architecture, wherein the first or client tier provides a graphical user interface (GUI) or other application, the second or middle tier provides a multi-dimensional view of the data, and the third or server tier comprises a relational database management system (RDBMS) that stores the data.

Most queries in OLAP systems are complex and require the aggregation of large amounts of data. However, decision support applications in OLAP systems need to be interactive and demand fast response times. Different techniques to speed up queries have been studied and implemented, both in research and industrial systems. These include pre-computation of aggregates in the RDBMS, having specialized index structures, and caching in the middle tier.

The problem of pre-computing a cube has been studied in [AAD+96], [ZDN97], and [RS97]. [SDNR96] deals with the issue of the space required for pre-computation. Picking GROUP-BYs to pre-compute has been studied in [HRU96] and [SDN98]. [RKR97] and [KR98] consider the problem of efficient organization of the cube data.

In the field of caching, [SSV] presents replacement and admission schemes specific to warehousing. The problem of answering queries with aggregation using views has been studied extensively in [SDJL96]. [SLCJ98] presents a method for dynamically assembling views based on granular view elements which form the building blocks.

Semantic query caching for client-server systems has been studied in [DFJST]. A recent work on semantic caching is based on caching Multidimensional Range Fragments (MRFs), which correspond to semantic regions having a specific shape [KR99]. Each dimension in a MRF either covers the entire range on the dimension or is a point selection on the dimension.

Another kind of caching is chunk-based caching, which is a semantic caching method optimized for the domain of OLAP systems. Chunk-based caching was proposed in [DRSN98]. The motivation of chunk-based caching is to allow a query to take advantage of overlap with previous queries, even if the later queries are not totally contained in the previous queries.

Generally, these different caching techniques have focused on using cached results from a previous query as the answer to another query. This strategy is effective when the query stream exhibits a high degree of locality. Unfortunately, it misses the dramatic performance improvements obtainable when the answer to a query, while not immediately available in the cache, can be computed from data in the cache. The present invention considers answering queries by aggregating data in the cache.

SUMMARY OF THE INVENTION

The present invention discloses a method, apparatus, and article of manufacture for caching multi-dimensional data sets for an on-line analytical processing (OLAP) system. An "active cache" is used, wherein the cache can not only answer queries that match data stored in the cache, but can also answer queries that require aggregation or other computation of the data stored in the cache.

BRIEF DESCRIPTION OF THE DRAWINGS

Referring now to the drawings in which like reference numbers represent corresponding parts throughout:

FIG. 5 illustrates a schema with three dimensions A, B and C;

FIG. 6 shows a lattice of GROUP-BYs formed by the dimensions of FIG. 5;

FIG. 12 shows a simple lattice and the different costs of computation;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention answers queries in an OLAP system by aggregating data stored in a cache. This is considered an "active cache", i.e., one that can not only speed queries that "match" data in the cache, but can also answer queries that require aggregation of data in the cache. The present invention shows that a cache with such an ability is much more effective than a cache without such a capability.

The first issue to be dealt with is that, in such an active cache, the lookup process is considerably more complex than it is in an ordinary cache, because it is not sufficient to determine if the query result is in the cache. It must be determined if the data in the cache is a sufficient basis from which to compute the answer to the query. This problem is especially difficult with fine granularity caching schemes, such as chunk-based caching [DRSN98], query caching [SDJL96], and semantic caching [DFJST]. This lookup must be fast; as it is not feasible to spend a substantial amount of time deciding if a query can be computed from the cache, because it is possible that the lookup cost itself could exceed the time required to bypass the cache and execute the query in the RDBMS.

The second issue to be dealt with is that, in such an active cache, there can be multiple ways in which to perform the aggregation required to answer the query. This situation arises due to the hierarchical nature of OLAP multidimensional data. In general, there are multiple aggregation paths for any query. The multiple aggregation paths complicate the cache lookup problem even further, since now not only is it necessary to determine if a query is computable from the cache, one must also find the best way of doing this computation.

Hardware and Software Environment

Figure 1:
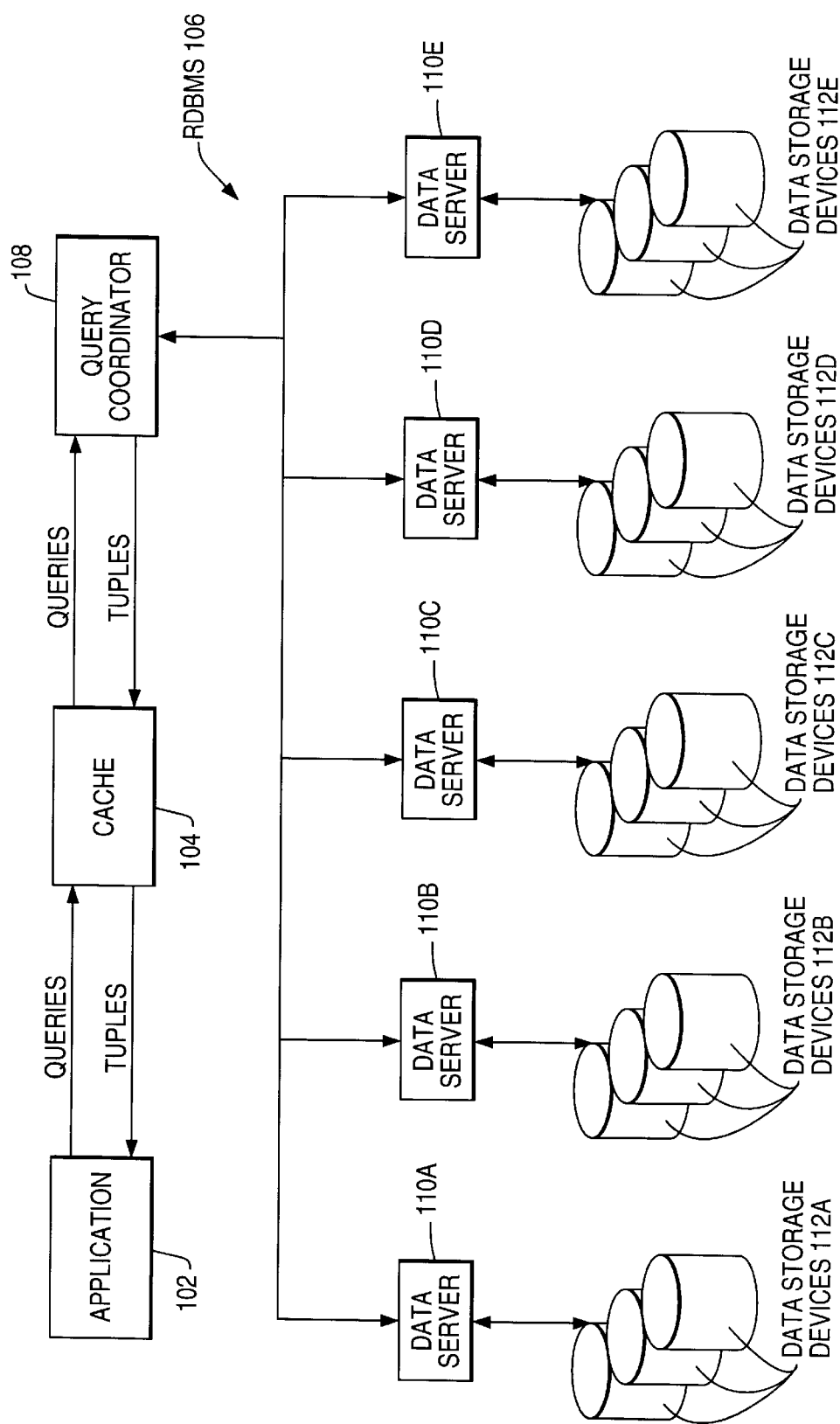
FIG. 1 illustrates an exemplary hardware and software environment that could be used with the present invention.

FIG. 1 illustrates an exemplary hardware and software environment that could be used with the present invention. In the exemplary environment, a computer system 100 implements an OLAP (On-Line Analytic Processing) system in a three-tier client-server architecture, wherein the first or client tier provides a graphical user interface (GUI) or other application 102, the second or middle tier provides a cache 104 for storing multi-dimensional data, and the third or-server tier comprises a relational database management system (RDBMS) 106 that generates the multi-dimensional data from tables stored in a relational database.

In the preferred embodiment, the RDBMS 106 includes a query coordinator 108 and one or more data servers 110A–110E storing the relational database in one or more data storage devices 112A–112E. The query coordinator 108 and data servers 110 may be implemented in separate machines, or may be implemented as separate or related processes in a single machine. The RDBMS 106 used in the preferred embodiment comprises the Teradata® RDBME sold by NCR Corporation, the assignee of the present invention.

In the preferred embodiment, the system 100 may use any number of different parallelism mechanisms. Tables within the relational database may be fully partitioned across all data storage devices 112 in the system 100 using round robin, hash, spatial declustering, or other partitioning methods. Generally, the data servers 110 perform operations against the relational database in a parallel manner as well.

For example, the query coordinator 108 receives a query from an application 102, such as a graphical user interface (GUI) or other front-end application. After parsing and optimization, the query coordinator 108 generates an execution plan for the query, parallelizes the query execution plan, and transmits the parallel portions of the query execution plan to the appropriate data servers 110 for execution. Query results including parallel result sub-sets are collected by the query coordinator 108 for storage into the cache 104 as well as delivery back to the application 102.

Operation of the Active Caching

1 Introduction

Figure 2:
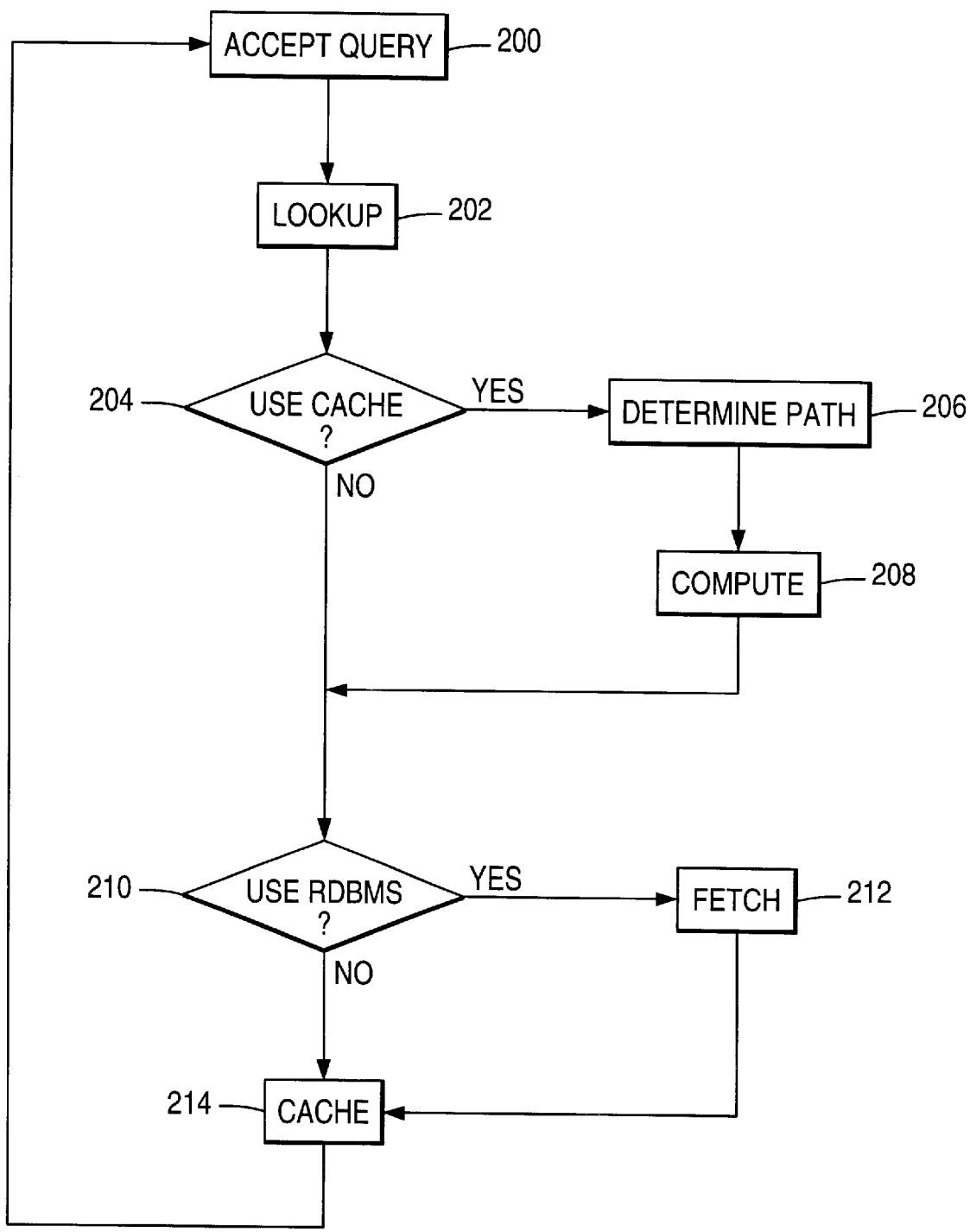
FIG. 2 is a flowchart that illustrates the general concept of the present invention, which provides a novel form of "active caching" for OLAP systems that provides dramatic performance improvements when the answer to a query, while not immediately available in the cache, can be computed from the cache.

FIG. 2 is a flowchart that illustrates the general concept of the present invention, which provides a novel form of "active caching" for OLAP systems that provides dramatic performance improvements when the answer to a query, while not immediately available in the cache 104, can be computed from the cache 104.

Block 200 represents the OLAP system accepting a query from a user.

Block 202 represents the OLAP system performing a cache 104 lookup function for the query.

Block 204 is a decision block that represents the OLAP system determining whether it is possible to answer at least a portion of the query from the cache 164. If so, control transfers to Block 206; otherwise, control transfers to Block 210.

Block 206 represents the OLAP system determining which path to use in performing computations on the multi-dimensional data stored in the cache 104.

Block 208 represents the OLAP system performing the computations on the multi-dimensional data stored in the cache 104 in order to generate at least part of the answer to the query.

Block 210 is a decision block that represents the OLAP system determining whether it is possible to answer at least a portion of the query from the RDBMS 106. If so, control transfers to Block 212; otherwise, control transfers to Block 214.

Block 212 represents the OLAP system fetching the multi-dimensional data from the RDBMS 106 in order to generate at least part of the answer to the query.

Finally, Block 214 represents the OLAP system storing the multi-dimensional data used to answer the query into the cache 104.

Thus, as shown in FIG. 2, in order to use aggregation in the cache 104, two problems are solved by the present invention: (1) determining when it is possible to answer a query by aggregating data in the cache 104, and (2) determining the fastest path for this aggregation. In the preferred embodiment, a Virtual Count Method (VCM) is used to determine whether an answer to a query can be computed from the cache 104. A cost-based VCM(VCMC) maintains cost-based information that can be used to determine the fastest path for the computation.

2 Chunk-based Caching

As noted above, chunk-based caching was proposed in [DRSN98]. The motivation for chunk-based caching is to allow later queries to take advantage of any data overlap in the cache 104 with stored results from previous queries, even if the answers for the later queries are not totally contained in the stored results from the previous queries.

Chunk-based caching takes advantage of the multi-dimensional nature of data in OLAP systems. The dimensions form a multi-dimensional space and data values are points in that space. The distinct values for each dimension are divided into ranges, thus dividing the multi-dimensional space into chunks.

Figure 3:
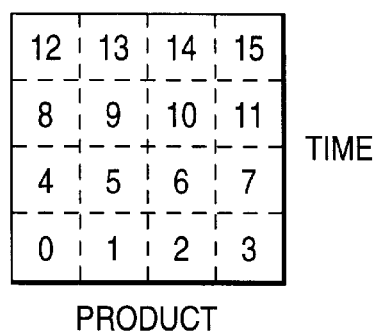
FIG. 3 shows a multidimensional space formed by two dimensions Product and Time, and the chunks at levels (Product, Time) and (Time)
Figure 3:
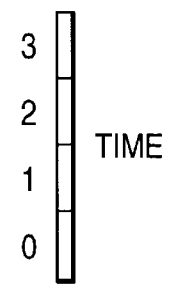

FIG. 3 shows a multidimensional space formed by two dimensions Product and Time, and the chunks at levels (Product, Time) and (Time). The caching scheme uses chunks as a unit of caching. This works well since chunks capture the notion of semantic regions. Note that there can be chunks at any level of aggregation.

In chunk-based caching, query results to be stored in the cache 104 are broken up into chunks and the chunks are cached. When a new query is issued, the query is analyzed to determine what chunks are needed to answer it. The cache 104 is then probed to find these chunks.

Depending on what chunks are present in the cache 104, the list of chunks is partitioned, wherein one partition comprises chunks that may be answered from the cache 104 and the other partition comprises missing chunks, which have to be computed from the RDBMS 106. To compute the missing chunks, one or more SQL statements may be issued to the RDBMS 106 translating the missing chunk numbers into one or more selection predicates.

Figure 4:
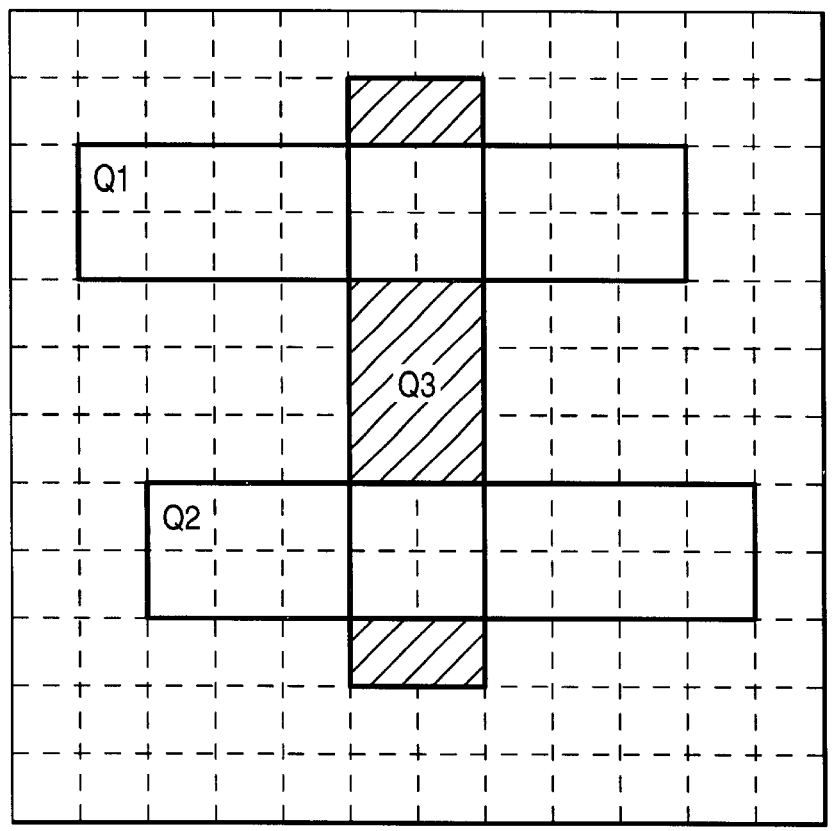
FIG. 4 shows three queries Q1, Q2 and Q3 that reuse cached chunks.

Example 2.1. FIG. 4 shows three queries Q1, Q2 and Q3 which are issued in that order. Q3 can use some of the cached chunks it has in common with Q1 and Q2. Only the missing chunks (marked by the shaded area) have to be computed from the RDBMS 106.

An important property used in the preferred embodiment is the closure property of chunks described in [DRSN98]. This means that there is a simple correspondence between chunks at different levels of aggregation. A set of chunks at a detailed level can be aggregated to get a chunk at higher level of aggregation. For example, FIG. 3 shows that chunk 0 of (Time) can be computed from chunks (0, 1, 2, 3) of (Product, Time).

[DRSN98] shows that chunk-based caching performs better than complete query caching. The main reasons for this are that chunking achieves fine granularity of caching and allows for partial reuse of results. The query need not be completely contained in the cache 104. Chunks which are present can be reused and only the missing chunks are computed at the RDBMS 106. Performance can be further improved by having a chunk-based file organization in the RDBMS 106.

3 Aggregations in the Cache

This section considers the problem of aggregation in more detail. In a multi-dimensional schema, there are many possible levels of aggregation, each of which corresponds to a different GROUP-BY operation. These GROUP-BYs can be arranged in the form of a lattice having nodes and paths between nodes, wherein the nodes represent the GROUP-BYs and the paths indicate a "can be computed by" relationship. This kind of structure has been extensively used in previous work [AAD+96, SDN96, HRU98].

Example 3.1. Consider a schema with three dimensions A, B and C Dimension B has a two level hierarchy defined on it, whereas A and C have a single level hierarchy as shown in FIG. 5. FIG. 6 shows the lattice formed by these dimensions, wherein (x, y, z) denotes the level on each of the dimensions, (1, 2, 1) is the most detailed level ($A_1B_2C_1$), and (0, 0, 0) is the most aggregated level ($A_0B_0C_0$).

For any GROUP-BY, there are many GROUP-BYs from which it can be computed. In general, a GROUP-BY ($x_1$, $y_1$, $z_1$) can be computed from ($x_2$, $Y_2$, $z_2$) if $x_1 \leq x_2$, $y_1 \leq y_2$ and $z_1 \leq z_2$. For example, GROUP-BY (0, 2, 0) can be computed from (0, 2, 1) or (1, 2, 0). Thus, there is a need to consider all the parent nodes in the lattice to determine if a particular GROUP-BY query can be answered from the cache 104.

The problem becomes more complex when using the chunk-based caching scheme. Due to the closure property, there is a simple correspondence between chunks at different levels of aggregation. For example, a chunk at level (0, 2, 0), e.g. chunk 0, will map to a set of chunks at level (1, 2, 0), e.g. chunks 0 and 1. To compute chunk 0 of (0, 2, 0) from (1, 2, 0), both chunks 0 and 1 of (1, 2, 0) are needed. It may happen that only chunk 0 of (1, 2, 0) is present in the cache 104, whereas chunk 1 is computable from other chunks. This implies that chunk 0 of (0, 2, 0) is still computable from the cache 104. Thus, to determine if a chunk of a particular GROUP-BY is computable from the cache 104, it is necessary to explore all paths in the lattice from a node representing a particular GROUP-BY to a node representing a base GROUP-BY. FIG. 6 shows the different paths possible for computation of a chunk of (0, 2, 0).

3. Exhaustive Search Method

The Exhaustive Search Method (ESM) is a simple implementation for determining whether a chunk is computable from the cache 104. If a chunk is missing from the cache 104, it searches along all paths to the base GROUP-BY, to determine whether the chunk can be computed from the cache 104.

Figure 7:
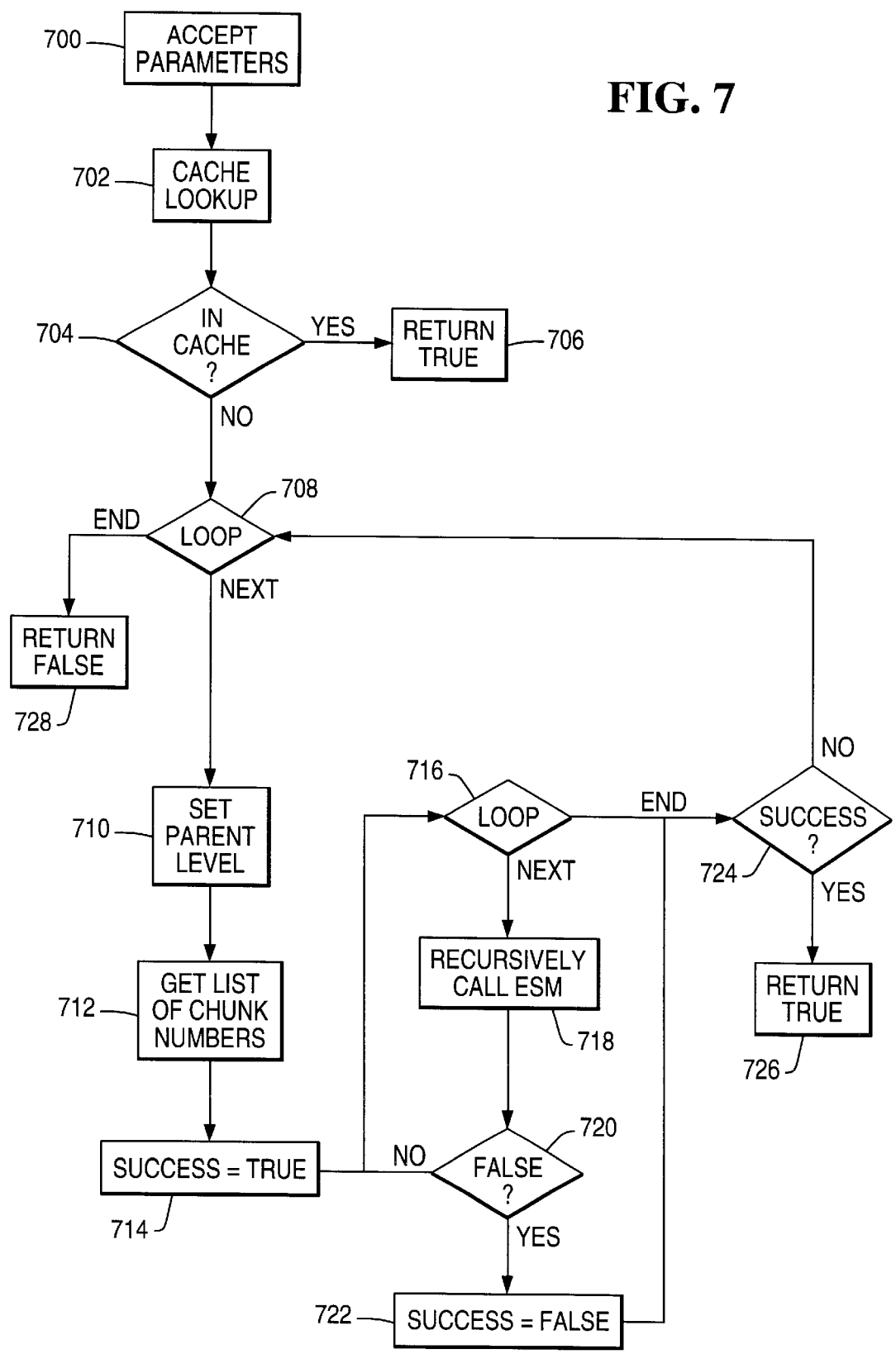
FIG. 7 is a flowchart that illustrates the Exhaustive Search Method (ESM) performed by the OLAP system according to the preferred embodiment of the present invention.

FIG. 7 is a flowchart that illustrates the ESM performed by the OLAP system according to the preferred embodiment of the present invention.

Block 700 represents the ESM accepting two input parameters: Level and ChunkNumber. Level indicates the GROUP-BY level, and ChunkNumber identifies the chunk that needs to be computed to answer the query. Also note that the ESM generates two output parameters: Success and Path. Success indicates if the chunk is computable and Path indicates the path for a successful computation.

Block 702 represents the ESM performing a CacheLookup function with Level, ChunkNumber as parameters.

Block 704 is a decision block that represents the ESM determining if the chunk is in the cache 104, based on the result returned from the CacheLookup function. If the chunk is in the cache 104, then control transfers to Block 706 to return a value of "true"; otherwise, control transfers to Block 708.

Block 708 is a decision block that represents the ESM looping through the lattice to examine each parent GROUP-BY. For each parent GROUP-BY, control transfers to Block 710. Upon completion of the loop, control transfers to Block 728.

Block 710 represents the ESM setting the Parentlevel to the level of the parent GROUP-BY.

Block 712 represents the ESM retrieving the parent chunk numbers using the ChunkNumber, Level, and ParentLevel, and pointing to the list of parent chunk numbers using the ParentChunkNumbersList.

Block 714 represents the ESM setting Success to "true".

Block 716 is a decision block that represents the ESM looping through the parent chunk numbers in the ParentChunkNumbersList. For each parent chunk number, control transfers to Block 718. Upon completion of the loop, control transfers to Block 724.

Block 718 represents the ESM recursively invoking the ESM using the ParentLevel and parent chunk number.

Block 720 is a decision block that represents the ESM determining if the ESM returned a "false" value. If so, then control transfers to Block 722; otherwise, control transfers to Block 716.

Block 722 represents the ESM setting Success to "false".

Block 724 is a decision block that represents the ESM determining if Success is set to a "true" value. If so, then control transfers to Block 726, which returns a "true" result; otherwise, control transfers to Block 708.

Algorithm; ESM(Level, ChunkNumber)

The ESM is provided below in pseudo-code:

Inputs: Level—Indicates the GROUP-BY level
ChunkNumber—Identifies chunk that needs to be computed Outputs: success—to indicate if the chunk is computable
path—path for a successful computation

```
if (CacheLookup(Level, ChunkNumber)) // Lookup in the cache
    return true;
For each Parent GROUP-BY in the lattice
    ParentLevel = level of the Parent GROUP-BY
    ParentChunkNumbersList = GetParentChunkNumbers(ChunkNumber,
        Level, ParentLevel)
    success = true;
    For each chunk number CNum in ParentChunkNumbersList
        if (!ESM(ParentLevel, CNum))
            success = false
            break
    if (success)
        return true
return false
```

In the ESM, GetParentChunkNumbers is a function that maps a chunk at one level to a set of chunks at a more detailed level. The ESM searches different paths and quits as soon as it finds a successful path. As it explores the different paths, the ESM has to keep track of what chunks have been found at what level. This is required so that if a search is successful, all the chunks found during the search can be aggregated to give the required chunk.

Lemma 3.1. Consider a schema having n dimensions, with hierarchies of size $h_i$ on dimension i. Let $(l_1, l_2, \ldots, l_n)$ denote the level of a GROUP-BY. Note that $(0, 0, \ldots, 0)$ is the most aggregated level and $(h_1, h_2, \ldots, h_n)$ is the base level. The maximum number of paths in the lattice searched by ESM for a GROUP-BY at level $(l_1, l_2, \ldots, l_n)$ is given by:

$$\frac{\left(\sum_{i=1}^{n}(h_i - l_i)\right)!}{\prod_{i=1}^{n}(h_i - l_i)!}$$

Proof: his comes from the observation that any path from $(l_1, l_2, \ldots, l_n)$ to the base node $(h_1, h_2, \ldots, h_n)$ is traversed, the level in one of the dimensions is increasing by one for each step in the path. Each different order of this increase leads to a new path. This leads to the factorial number of possible combinations in the numerator. The denominator is due to the fact that the order within each dimension is not important. The actual number of recursive calls to ESM is much higher than this because a single aggregate chunk maps to multiple chunks at a detailed level (through the MapChunkNumbers( ) function) and ESM has to be called on each of those chunks, i.e., there is a fan-out along each step of the path.

Lemma 3.1 suggests that the complexity of determining if a chunk can be computed from the cache 104 depends on the level of aggregation of the chunk. For highly aggregated chunks, the number of paths searched is higher since there are many ways to compute them. For example, for the most aggregated level $(0, 0, \ldots, 0)$, it is $(h_1+h_2 \ldots +h_n)!/(h_1!*h_2!* \ldots *h_n!)$. Note that this is the worst case complexity. The ESM will complete as soon as it finds one way to compute the chunk For example, if the chunk is already present in the cache 104, ESM quits immediately. The average complexity depends on the actual contents of the cache 104. This is experimentally demonstrated in Section 7 for different cases.

4 Virtual Count Method

The Virtual Count Method (VCM) improves upon the ESM. The strategy of the VCM is motivated by two observations:

1. As the ESM searches along different paths, many vertices are visited multiple times. This is because of the lattice structure, where the paths are not disjoint, and will have multiple common vertices.

Figure 8:
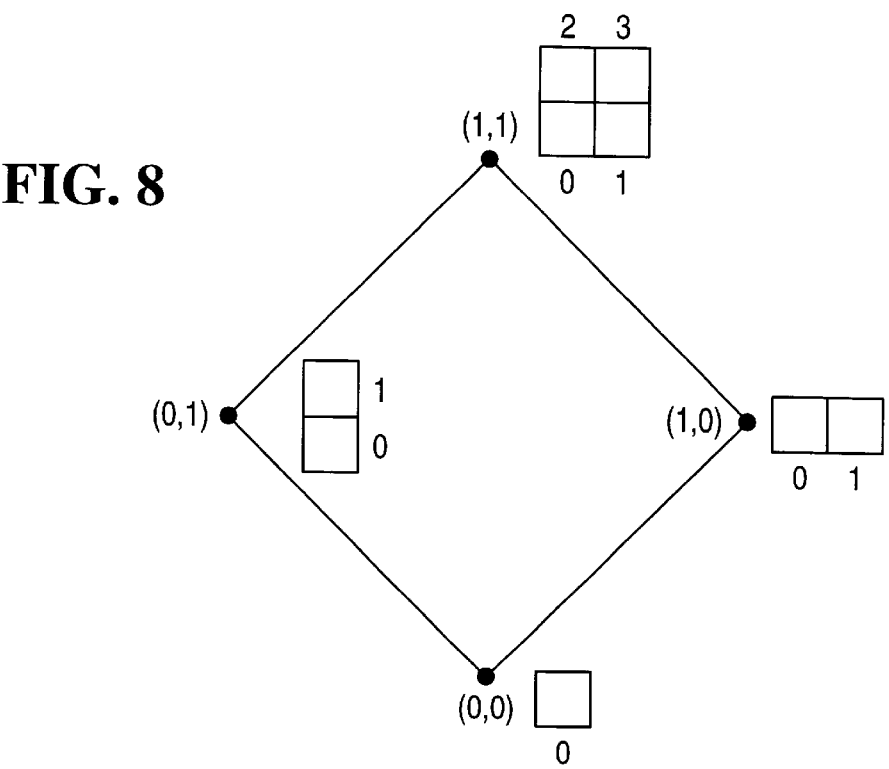
FIG. 8 illustrates a small sub-section of a lattice and a search along the paths of the lattice.

Example 4.1. Consider a small sub-section of a lattice as shown in FIG. 8. Suppose the ESM is searching for chunk 0 at level (0, 0). Two of the paths from (0, 0) intersect at (1, 1). As the ESM searches these two paths, it will search for each of chunks 0, 1, 2 and 3 at level (1, 1) two times, i.e., once for each path. It does not reuse the work done previously.

2. A lot of the work can be reused by maintaining some summary of the state of the cache 104 in terms of some meta-information about each chunk.

In accordance with these observations, the VCM maintains a count for each chunk at each GROUP-BY level. A chunk may be either directly present in the cache 104 or may be computable through some path. Each path has to pass through some parent of that node in the lattice. Thus, the virtual count for a chunk is defined as provided below.

Definition 4.1 (Virtual Count). The virtual count for a chunk indicates the number of parents of that node through which there is a successful computation path. The count is incremented by one if the chunk is directly present in the cache 104.

Figure 9:
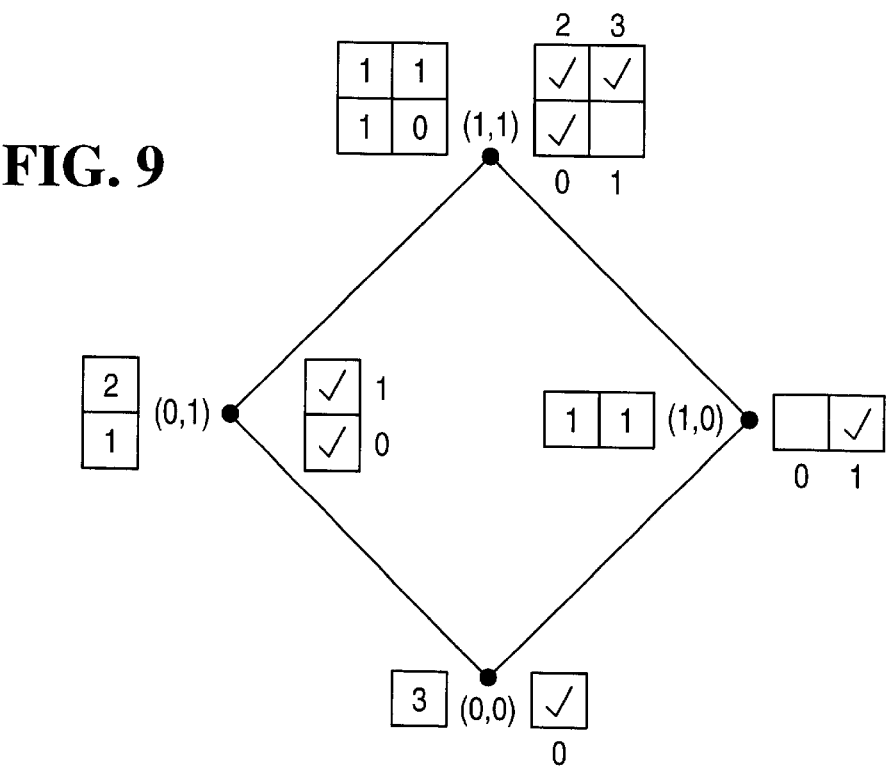
FIG. 9 shows a simple lattice with two dimensions having hierarchy size of one each.

Example 4.2. FIG. 9 shows a very simple lattice with two dimensions having hierarchy size of 1 each. Level (1, 1) has 4 chunks, levels (1, 0) and (0, 1) have 2 chunks each, and level (0, 0) has only 1 chunk The figure shows the chunks that are present in the cache 104 and the counts maintained by the VCM. Chunk 0 at level: (1, 1) has count 1 since it is present in the cache 104 and that is the only way to compute it. Chunk 1 at level (1, 1) is not computable, nor is it present in the cache 104, thus giving a count of 0. Chunk 0 at level (1, 0) has a count of 1 even though it is not present in the cache 104. This is because there is a successful computation path through one of its parents, i.e., level (1, 1). Chunk 0 at level (0, 0) is present in the cache 104. Also, there are successful computation paths through two of its parents. Thus, the count for chunk 0 at level (0, 0) is 3.

Note that the count is not equal to the total number of ways of computing a chunk but is just indicative of whether a chunk is computable. If a node has k parents in the lattice, a chunk of that node cannot have a count greater than k+1. There is a subtle reason for defining the count in this way rather than as the total number of successful paths. The reason is explained in the proof of lemma 4.1. Once these counts are maintained, determining if a chunk is computable from the cache 104 is trivial due to the following property, upon which the next algorithm is based.

Property 4.1. The virtual count of a chunk is non-zero if and only if it is computable from the cache 104.

Proof. The proof of the above follows from the definition of virtual count and the observation that any path of computation must pass through some parent node.

Figure 10:
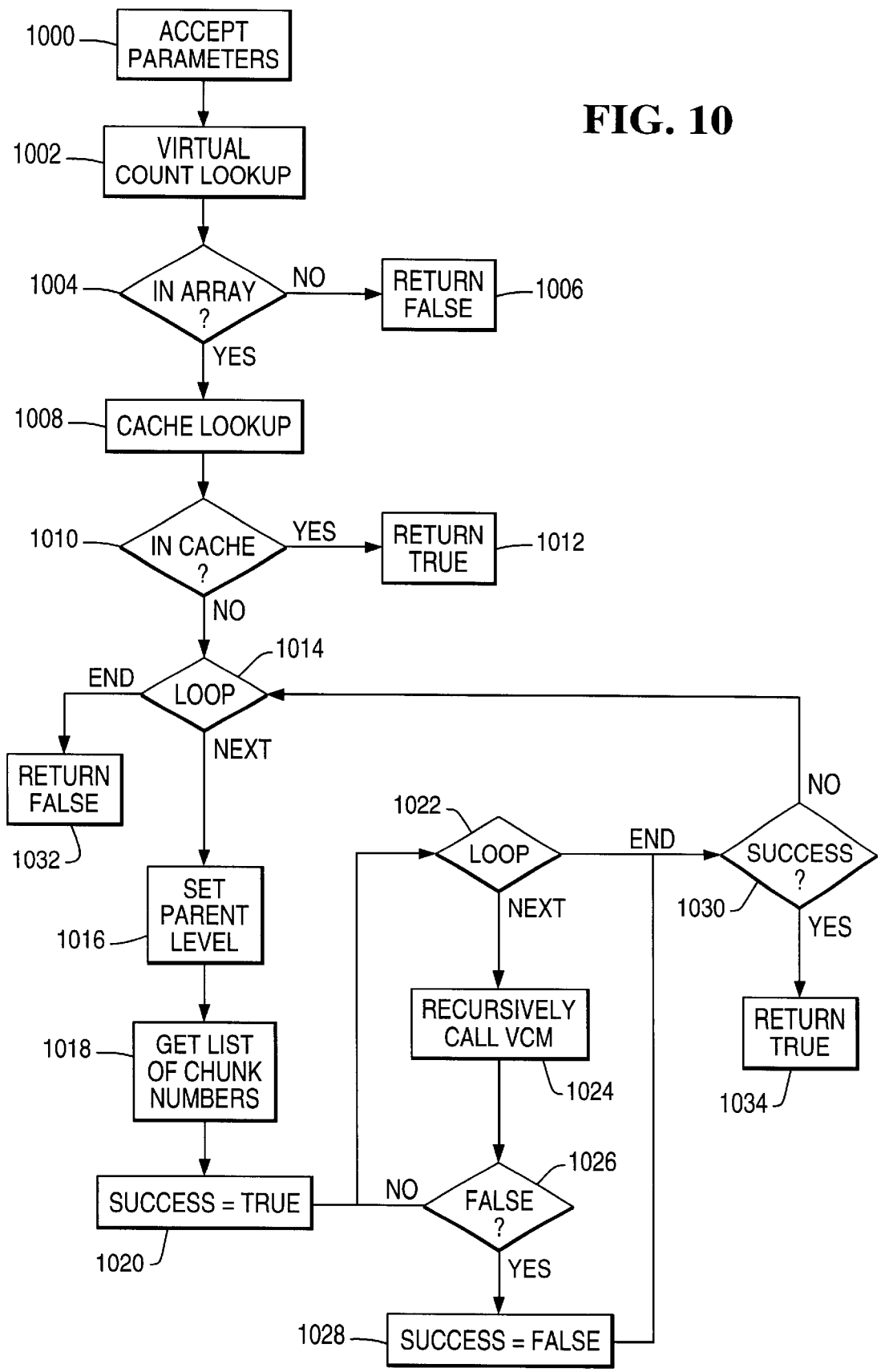
FIG. 10 is a flowchart that illustrates the Virtual Count Method (VCM) performed by the OLAP system according to the preferred embodiment of the present invention.

FIG. 10 is a flowchart that illustrates the Virtual Count Method (VCM) performed by the OLAP system according to the preferred embodiment of the present invention.

Block 1000 represents the VCM accepting two input parameters: Level and ChunkNumber. Level indicates the GROUP-BY level, and ChunkNumber identifies the chunk that needs to be computed to answer the query. Also note that the VCM generates two output parameters: Success and Path. Success indicates if the chunk is computable and Path indicates the path for a successful computation.

Block 1002 represents the VCM performing a Virtual Count Lookup function with Level and ChunkNumber as parameters.

Block 1004 is a decision block that represents the VCM determining if the Virtual Count for the chunk is in the array of counts, based on the result returned from the Virtual Count Lookup function. If the Virtual Count is not in the array, then control transfers to Block 1006 to return a value of "false"; otherwise, control transfers to Block 1008.

Block 1008 represents the VCM performing a CacheLookup function with Level and ChunkNumber as parameters.

Block 1010 is a decision block that represents the VCM determining if the chunk is in the cache 104, based on the result returned from the CacheLookup function. If the chunk is in the cache 104, then control transfers to Block 1012 to return a value of "true"; otherwise, control transfers to Block 1014.

Block 1014 is a decision block that represents the VCM looping through the lattice to examine each parent GROUP-BY. For each parent GROUP-BY, control transfers to Block 1016. Upon completion of the loop, control transfers to Block 1032.

Block 1016 represents the VCM setting the ParentLevel to the level of the parent GROUP-BY.

Block 1018 represents the VCM retrieving the parent chunk numbers using the ChunkNumber, Level, and ParentLevel parameters, and pointing to the list of parent chunk numbers using the ParentChunkNumbersList.

Block 1020 represents the VCM setting Success to "true".

Block 1022 is a decision block that represents the VCM looping through the parent chunk numbers in the ParentChunkNumbersList. For each parent chunk number, control transfers to Block 1024. Upon completion of the loop, control transfers to Block 1030.

Block 1024 represents the VCM recursively invoking the VCM using the ParentLevel and parent chunk number.

Block 1026 is a decision block that represents the VCM determining if the recursively invoked VCM returned a "false" value. If so, then control transfers to Block 1028; otherwise, control transfers to Block 1022.

Block 1028 represents the VCM setting Success to "false".

Block 1030 is a decision block that represents the VCM determining if Success is set to a "true" value. If so, then control transfers to Block 1034, which returns a "true" result; otherwise, control transfers to Block 1014.

Algorithm: VCM(Level, ChunkNumber)

The VCM is provided below in pseudo-code:

Inputs: Level—Indicates the GROUP-BY level
ChunkNumber—Identifies chunk that needs to be computed Outputs: success—to indicate if the chunk is computable
path—path for a successful computation

```
if (Count(Level, ChunkNumber) == 0) // Count is the array of counts        (I)
    return false;
if (CacheLookup(Level, ChunkNumber))
    return true;
For each Parent GROUP-BY in the lattice
    ParentLevel = level of the Parent GROUP-BY
    ParentChunkNumbersList = GetParentChunkNumbers(ChunkNumber,
        Level, ParentLevel)
    success = true;
    For each chunk number CNum in ParentChunkNumbersList
        if (!VCM(ParentLevel, CNum))
            success = false
            break
    if (success)
        return true
assert(false) // control should never reach here
```

VCM maintains information about the chunks found on the successful path, so that they can be aggregated. VCM looks similar to ESM in structure. However, the check for Count to be non-zero in statement (I) acts as a short circuit to reduce the complexity. If a chunk is not computable from the cache 104, VCM returns in constant time (just a single count lookup). If a chunk is indeed computable, VCM explores exactly one path (the one which is successful). Unsuccessful paths are rejected immediately without exploring completely. Compare this with the factorial number of paths for ESM The complexity of VCM is constant in the number of paths making it much faster than the ESM.

4.1 Maintaining the Counts

Maintenance of the virtual counts makes lookups instantaneous. However, it adds an overhead when chunks are inserted or deleted from the cache 104. The counts will be updated at that time. The update method is provided below.

Figure 11:
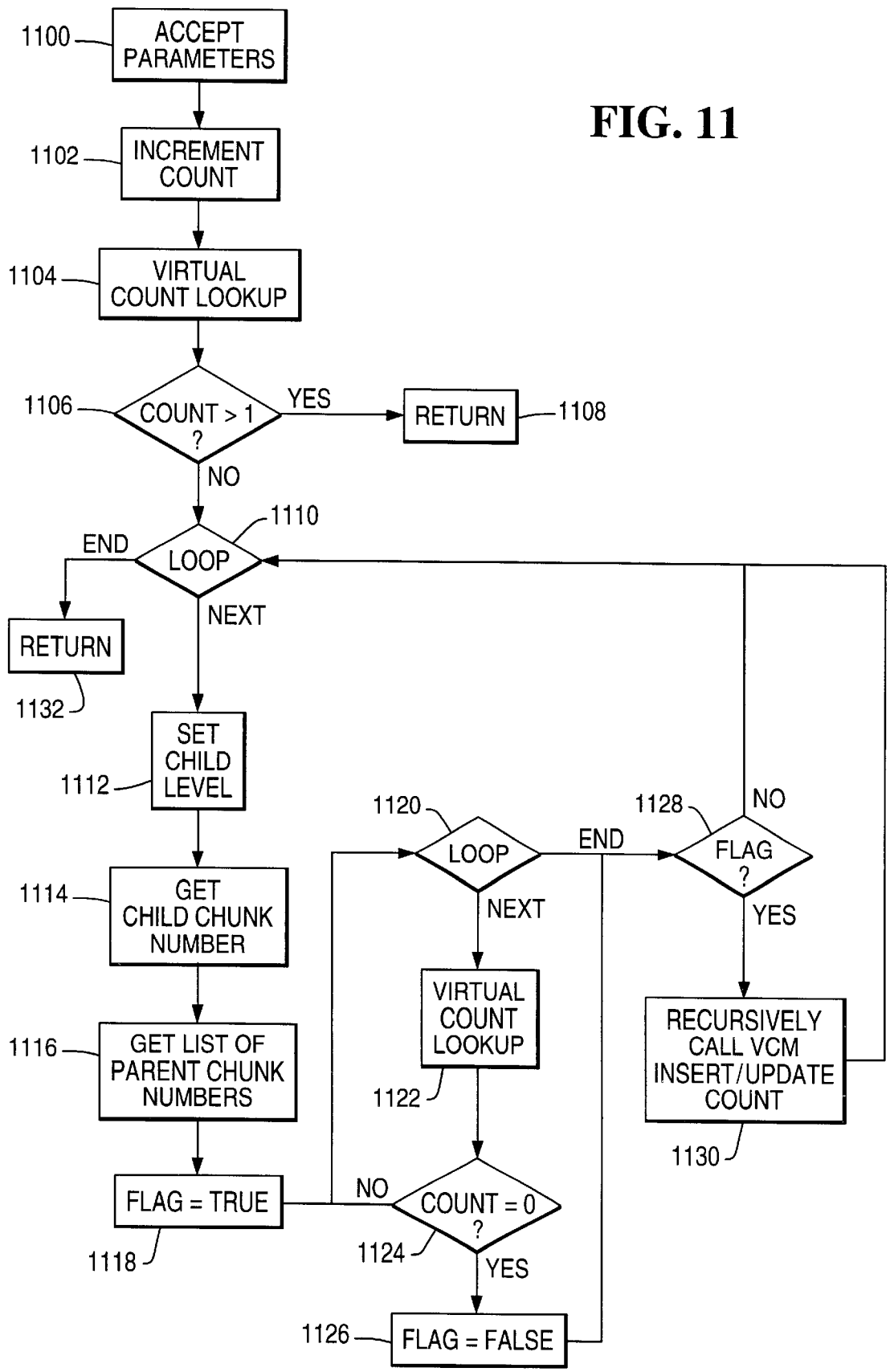
FIG. 11 is a flowchart that illustrates the Virtual Count Method Insert Update Count (VCM_InsertUpdateCount) performed by the OLAP system according to the preferred embodiment of the present invention.

FIG. 11 is a flowchart that illustrates the VCM Insert/Update Count Method (VCM_InsertUpdateCount) performed by the OLAP system according to the preferred embodiment of the present invention.

Block 1100 represents the VCM_InsertUpdateCount accepting two input parameters: Level and ChunkNumber. Level indicates the GROUP-BY level, and ChunkNumber identifies the chunk that needs to be computed to answer the query. Also, note that the VCM_InsertUpdateCount does not generate any output parameters:

Block 1102 represents the VCM_InsertUpdateCount incrementing the Virtual Count in the array using the Level and ChunkNumber parameters as indices into the array.

Block 1104 represents the VCM_InsertUpdateCount performing a Virtual Count Lookup function with Level and ChunkNumber as parameters.

Block 1106 is a decision block that represents the VCM_InsertUpdateCount determining if the Virtual Count for the chunk is greater than 1, based on the result returned from the Virtual Count Lookup function. If so, then control transfers to Block 1108 to exit the method; otherwise, control transfers to Block 1110.

Block 1110 is a decision block that represents the VCM_InsertUpdateCount looping through the lattice to examine each child GROUP-BY. For each child GROUP-BY, control transfers to Block 1112. Upon completion of the loop, control transfers to Block 1132, which exits VCM_InsertUpdateCount.

Block 1112 represents the VCM_InsertUpdateCount setting the ChildLevel to the level of the child GROUP-BY.

Block 1114 represents the VCM_InsertUpdateCount retrieving the child chunk number using the ChunkNumber, Level, and ChildLevel.

Block 1116 represents the VCM_InsertUpdateCount pointing to the list of parent chunk numbers for the current child chunk number using the ChunkNumbersList.

Block 1118 represents the VCM_InsertUpdateCount setting a flag to "true".

Block 1120 is a decision block that represents the VCM_InsertUpdateCount looping through the parent chunk numbers in the ChunkNumbersList. For each parent chunk number, control transfers to Block 1120. Upon completion of the loop, control transfers to Block 1128.

Block 1122 represents the VCM_InsertUpdateCount performing a Virtual Count Lookup function using the Level and chunk number in ChunkNumbersList as parameters.

Block 1124 is a decision block that represents the VCM_InsertUpdateCount determining if the Virtual Count is 0. If so, then control transfers to Block 1126; otherwise, control transfers to Block 1120.

Block 1126 represents the VCM_InsertUpdateCount setting the flag to "false".

Block 1128 is a decision block that represents the VCM_InsertUpdateCount determining if the flag is set to a "true" value. If true, then control transfers to Block 1130, which recursively invokes VCM_InsertUpdateCount with the parameters ChildLevel and the child chunk number, otherwise, control transfers to Block 1110.

Algorithm: VCM_InsertUpdateCount(Level, ChunkNumber)

The VCM_InsertUpdateCount method is provided below in pseudo-code:

Inputs: Level—Indicates the GROUP-BY level
ChunkNumber—Identifies chunk whose count needs to be incremented Outputs: none

```
Count(Level, ChunkNumber) = Count(Level, ChunkNumber) + 1
if (Count(Level, ChunkNumber) >1) // Chunk was previously computable
    return
For each Child GROUP-BY in the lattice
```

-continued

```
ChildLevel = level of the Child GROUP-BY
ChildChunkNumber = GetChildChunkNumber(ChunkNumber, Level,
    ChildLevel)
ChunkNumbersList = GetParentChunkNumbers(ChildChunkNumber,
    ChildLevel, Level)
flag = true;
For each chunk number CNum in ChunkNumbersList
    if (Count(Level, CNum) = 0)
        flag = false
        break
if (flag)
    VCM_InsertUpdateCount(ChildLevel, ChildChunkNumber)
```

Lemma 4.1. Suppose a new chunk is inserted in the cache 104 at level $(l_1, l_2, l_n)$. The number of counts updated is bounded by $n * \Pi_{i=1}^{n}(l_i+1)$.

Proof: The proof follows from an observation that for any new chunk inserted in the cache 104, a recursive call to VCM_InsertUpdateCount( ) occurs only on aggregated chunks to which the new chunk contributes. A chunk can contribute to only one chunk at each node in the sub-lattice below. The number of nodes in the sub-lattice: below $(l_1, l_2, \ldots, l_n)$ is given by $n * \Pi_{i=1}^{n}(l_i+1)$. Also, whenever an update is performed for a chunk, its virtual count is incremented by 1. By the definition of virtual count, contribution to the virtual count of any chunk from parent nodes cannot exceed n (since there are at most n parents for each node). Thus, the number of calls during the recursively invoked VCM_InsertUpdateCount( ) is bounded by $n * \lceil_{i=1}^{n}(l_i+1)$.

Note that the definition of virtual count plays a crucial part here. If the virtual count had been defined as the total number of successful paths to a chunk, the bound would have been much larger (since the factor n is replaced by a factorial number of paths). The trick of the VCM is to maintain sufficient information to determine if a chunk is computable, keeping the update cost minimal at the same time.

The exact complexity of a single insert depends on the cache 104 contents. The amortized complexity over all the inserts is much lower than this worst case complexity. This is because the updates are propagated only when a chunk becomes newly computable. A chunk can become newly computable only once. It could be more if there are deletes also, since a chunk can keep switching between the computable and non-computable state. However, this is not expected to happen very often for each chunk. Typically, a chunk insert will cause updates to propagate to only one level. This is similar to B-Tree splits, where most page splits do not propagate more than one level. The counts also have to be updated when a chunk is thrown out of the cache 104. The algorithm for that is similar to the VCM_InsertUpdateCount( ) method both in implementation and complexity.

It can be shown from Lemma 3.1 and 4.1 that the worst case complexity of the ESM find is much higher compared to the complexity of the updating the virtual count.

5 Cost Based Strategies

The ESM and the VCM find just one path for the computation of a chunk. The cost to compute a chunk from the cache 104 depends on the cost of aggregation. A linear cost of aggregation is assumed, i.e., the cost is proportional to the number of tuples aggregated. This assumption has been used previously, for solving the pre-computation problem [HRU96, SDN98]. There may be multiple successful paths through which a chunk could be computed. Each path will have different cost of computation depending on what chunks are being aggregated along that path. Both ESM and VCM can be extended to find the least cost path.

Example 5.1. Consider the simple lattice shown in FIG. 12. There are two paths for computation of chunk 0 at level (0, 0). One way is to aggregate chunk 1 at level (1, 0) and chunks 0 and 2 at level (1, 1). Another way is to aggregate chunks 0 and 1 at level (0, 1). The costs for these two options are different since the number of tuples being aggregated is different. In general, it is better to compute from a more immediate ancestor in the lattice, since GROUP-BY sizes keep reducing as they move down the lattice.

5.1 Cost Based ESM

Figure 13:
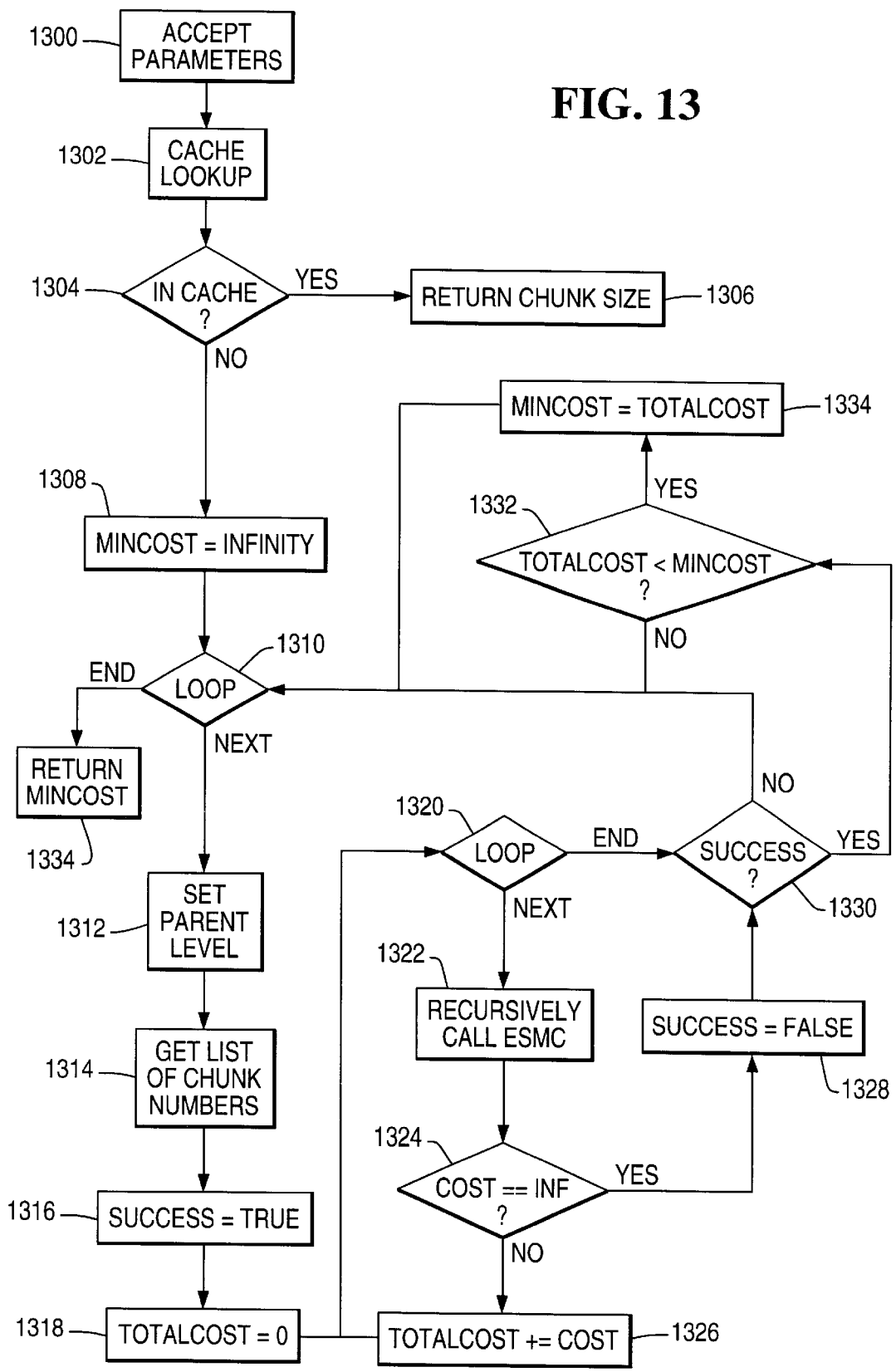
FIG. 13 is a flowchart that illustrates the cost-based Exhaustive Search Method (ESMC) performed by the OLAP system according to the preferred embodiment of the present invention.

FIG. 13 is a flowchart that illustrates the cost-based ESM (ESMC) performed by the OLAP system according to the preferred embodiment of the present invention.

Block 1300 represents the ESMC accepting two input parameters: Level and ChunkNumber. Level indicates the GROUP-BY level, and ChunkNumber identifies the chunk that needs to be computed to answer the query. Also note that the ESMC generates two output parameters: Cost and Path. Cost indicates the cost of the best path to compute the chunk and Path indicates the least cost path for a successful computation.

Block 1302 represents the ESMC performing a CacheLookup function with Level and ChunkNumber as parameters.

Block 1304 is a decision block that represents the ESMC determining if the chunk is in the cache 104, based on the result returned from the CacheLookup function. If the chunk is in the cache 104, then control transfers to Block 1306 to return the chunk size; otherwise, control transfers to Block 1308.

Block 1308 represents the ESMC setting the MinCost value to infinity.

Block 1310 is a decision block that represents the ESMC looping through the lattice to examine each parent GROUP-BY. For each parent GROUP-BY, control transfers to Block 1312. Upon completion of the loop, control transfers to Block 1334.

Block 1312 represents the ESMC setting the ParentLevel to the level of the parent GROUP-BY.

Block 1314 represents the ESMC retrieving the parent chunk numbers using the ChunkNumber, Level, and ParentLevel parameters, and pointing to the list of parent chunk numbers using the ParentChunkNumbersList.

Block 1316 represents the ESMC setting Success to "true".

Block 1318 represents the ESMC setting TotalCost to 0.

Block 1320 is a decision block that represents the ESMC looping through the parent chunk numbers in the ParentChunkNumbersList. For each parent chunk number, control transfers to Block 1320. Upon completion of the loop, control transfers to Block 1330.

Block 1322 represents the ESMC recursively invoking the ESMC using the ParentLevel and parent chunk number as parameters.

Block 1324 is a decision block that represents the ESMC determining if the recursively invoked ESMC returned a Cost value equal to infinity. If not, then control transfers to Block 1326; otherwise, control transfers to Block 1328.

Block 1326 represents the ESMC adding the Cost value returned from the recursively invoked ESMC to TotalCost. Thereafter, control transfers to Block 1320.

Block 1328 represents the ESMC setting Success to "false".

Block 1330 is a decision block that represents the ESMC determining if Success is set to a "true" value. If not, then control transfers to Block 1310; otherwise, control transfers to Block 1332.

Block 1332 is a decision block that represents the ESMC determining if TotalCost is less than MinCost. If not, then control transfers to Block 1310; otherwise, control transfers to Block 1334.

Block 1334 represents the ESMC setting MinCost equal to TotalCost. Thereafter, control transfers to Block 1310.

Algorithm: ESMC(Level, ChunkNumber)

The Cost-based ESM (ESMC) is provided below in pseudo-code:

Inputs: Level—Indicates the GROUP-BY level
ChunkNumber—Identifies chunk that needs to be computed Outputs: cost—cost of the best path to compute the chunk
path—least cost path for computation

```
if (CacheLookup(Level, ChunkNumber)) // Lookup in the cache
    return size of the chunk;
mincost = INF // INF = infinity
For each Parent GROUP-BY in the lattice
    ParentLevel = level of the Parent GROUP-BY
    ParentChunkNumbersList = GetParentChunkNumbers(ChunkNumber,
        Level, ParentLevel)
    success = true;
    totalcost = 0;
    For each chunk number CNum in ParentChunkNumbersList
        cost = ESMC(ParentLevel, CNum);
        if (cost == INF)
            success = false
            break
        else
            totalcost += cost;
    if ((success) && (totalcost <mincost))
        mincost = totalcost
return mincost
```

The ESMC, instead of quitting after finding the first path, continues to search for more paths which might be of lesser cost. The worst case complexity of ESMC is same as the ESM. However, its average case complexity is much higher since it always explores all paths to find the minimum cost path. Whether this extra time is worth it depends on the time saved in aggregation. Some experimental results are presented in Section 7 that examine this situation.

5.2 Cost Based VCM

The cost based VCM (VCMC) finds the best path for computing a chunk by maintaining cost information in addition to the count information. For each computable chunk it stores the cost of the least cost path to compute it and the parent through which the least cost path passes. There are two additional arrays for each level, wherein the Cost array that stores the least cost and the BestParent array that stores the parent through which the least cost path passes. The find complexity is still constant time, which makes this method very attractive.

Figure 14:
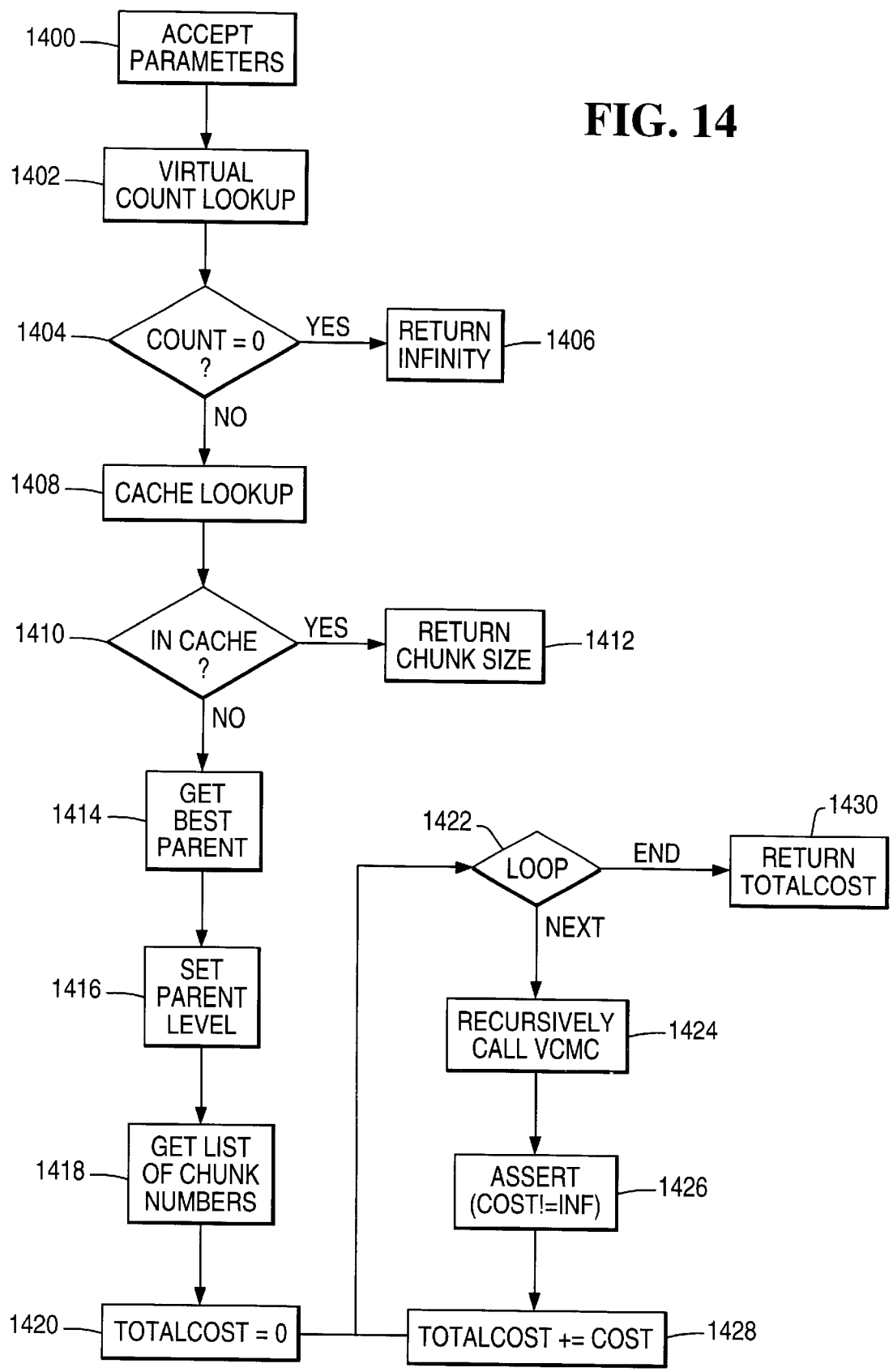
FIG. 14 is a flowchart that illustrates the cost-based Virtual Count Method (VCMC) performed by the OLAP system according to the preferred embodiment of the present invention.

FIG. 14 is a flowchart that illustrates the cost-based VCM (VCMC) performed by the OLAP system according to the preferred embodiment of the present invention.

Block 1400 represents the VCMC accepting two input parameters: Level and ChunkNumber. Level indicates the GROUP-BY level, and ChunkNumber identifies the chunk that needs to be computed to answer the query. Also note that the VCMC generates two output parameters: Cost and Path. Cost indicates the cost of the best path to compute the chunk and Path indicates the least cost path for a successful computation.

Block 1402 represents the VCMC performing a Virtual Count Lookup function with Level and ChunkNumber as parameters.

Block 1404 is a decision block that represents the VCMC determining if the Virtual Count for the chunk is 0, based on the result returned from the Virtual Count Lookup function. If so, then control transfers to Block 1406 to return an infinity value; otherwise, control transfers to Block 1408.

Block 1408 represents the VCMC performing a CacheLookup function with Level and ChunkNumber as parameters.

Block 1410 is a decision block that represents the VCMC determining if the chunk is in the cache 104, based on the result returned from the CacheLookup function. If the chunk is in the cache 104, then control transfers to Block 1412 to return the chunk size; otherwise, control transfers to Block 1414.

Block 1414 represents the VCMC retrieving the best parent using Level and ChunkNumber as parameters.

Block 1416 represents the VCMC setting the ParentLevel to the level of the parent identified by Block 1414.

Block 1418 represents the VCMC retrieving the parent chunk numbers using the ChunkNumber, Level, and ParentLevel as parameters, and pointing to the list of parent chunk numbers using the ParentChunkNumbersList.

Block 1420 represents the VCMC setting the TotalCost to 0.

Block 1422 is a decision block that represents the VCMC looping through the parent chunk numbers in the ParentChunkNumbersList. For each parent chunk number, control transfers to Block 1424. Upon completion of the loop, control transfers to Block 1430, which returns the TotalCost.

Block 1424 represents the VCMC recursively invoking the VCMC using the ParentLevel and parent chunk number.

Block 1426 represents the VCMC asserting 0 or 1, depending on whether the cost returned by the recursive invocation of the VCMC in Block 1424 is infinity (assert 0) or not (assert 1).

Block 1428 represents the VCMC adding the cost returned by the recursive invocation of the VCMC in Block 1424 to TotalCost. Thereafter, control returns to Block 1422.

Algorithm: VCMC(Level, ChunkNumber)

The Cost-based VCM (VCMC) is provided below in pseudo-code:

Inputs: Level—Indicates the GROUP-BY level
ChunkNumber—Identifies chunk that needs to be computed Outputs: cost—cost of the best path to compute the chunk
path—least cost path for computation

```
if (Count(Level, ChunkNumber) = 0)
    return INF;
if (CacheLookup(Level, ChunkNumber))
    return size of the chunk;
parent = BestParent(Level, ChunkNumber)
ParentLevel = level of parent
ParentChunkNumbersList = GetParentChunkNumbers(ChunkNumber, Level,
    ParentLevel)
totalcost = 0
For each chunk number CNum in ParentChunkNumbersList
    cost = VCMC(ParentLevel, CNum)
    assert(cost != INF)
    totalcost += cost
return totalcost
```

The Cost array is not being used by the VCMC, but is used by the update method, when inserting and deleting chunks. The update method is similar to the one used by VCM, except that, in VCMC, an update is propagated in two cases: (1) when a chunk becomes newly computable, and (2) when the least cost of computing a chunk changes. When the least cost changes, the costs of the children chunks are updated using the Cost array. The update method is similar to the VCM update method, but a little more complex. The worst case complexity of update remains the same, but the average complexity is slightly higher since an update is now propagated even when the least cost of a chunk changes.

Another advantage to maintaining the costs for the VCMC is that it can return the least cost of computing a chunk instantaneously (without actually doing the aggregation). This is very useful for a cost-based optimizer function of the RDBMS 106, which can then decide whether to aggregate in the cache 104 or access data from the RDBMS 106. In experiments by the inventors, pre-computed tables were not used in the RDBMS 106, so aggregating in the cache 104 was always faster. But, in the presence of pre-computed aggregate tables, executing queries at the RDBMS 106 might sometimes be faster. It is necessary to have a cost-based optimizer in the RDBMS 106 to make runtime decisions.

6 Replacement Policies

The possibility of aggregating the cache 104 contents to answer queries leads to interesting options for effectively using the cache 104 space. In [DRSN98], it was shown that a benefit based replacement policy works very well for chunks. In a simple cache 104, highly aggregated chunks have a greater benefit, since they are expensive to compute and thus are given a higher weight while caching.

For aggregate aware caching schemes, it is much more difficult to associate a benefit with a chunk. There are two reasons:

1. Other than being used to answer queries at the same level, a chunk can potentially be used to answer queries at a more aggregated level.

2. Whether a chunk can be used to answer a query at a more aggregated level depends on the presence of other chunks in the cache 104. This is because an aggregated chunk maps to a set of chunks at a more detailed level and all those chunks need to be present in order to compute the aggregated chunk. This also means that the benefit of a chunk is not constant, but keeps changing as the cache 104 contents change.

Figure 15A:
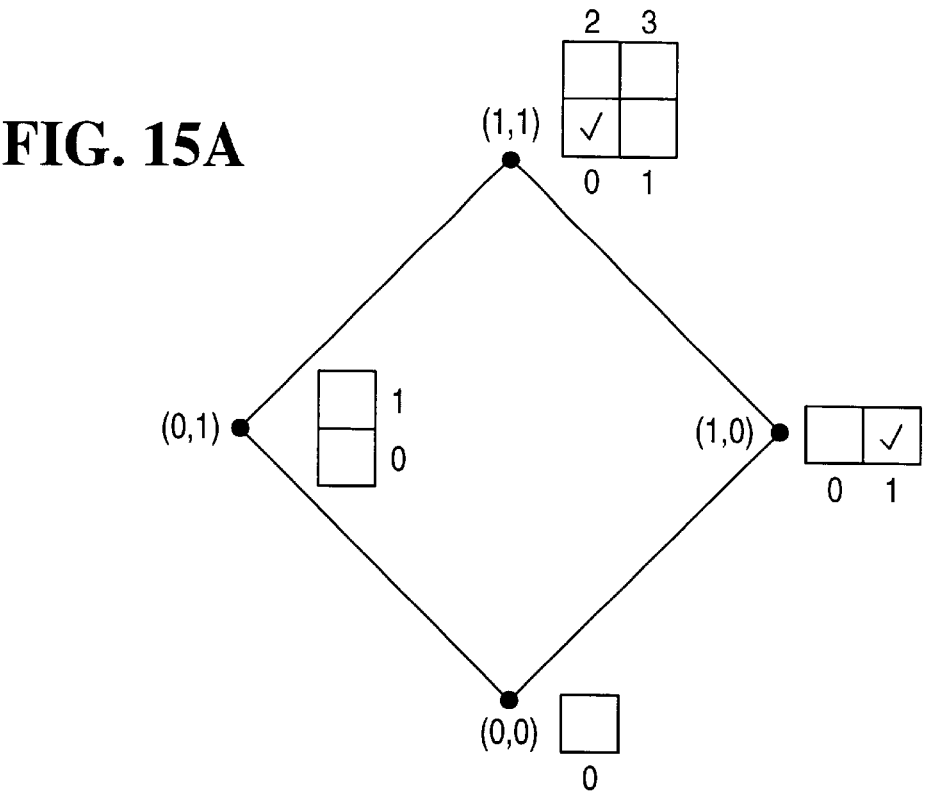
FIGS. 15A and 15B show a simple lattice for the computation of benefits.
Figure 15B:
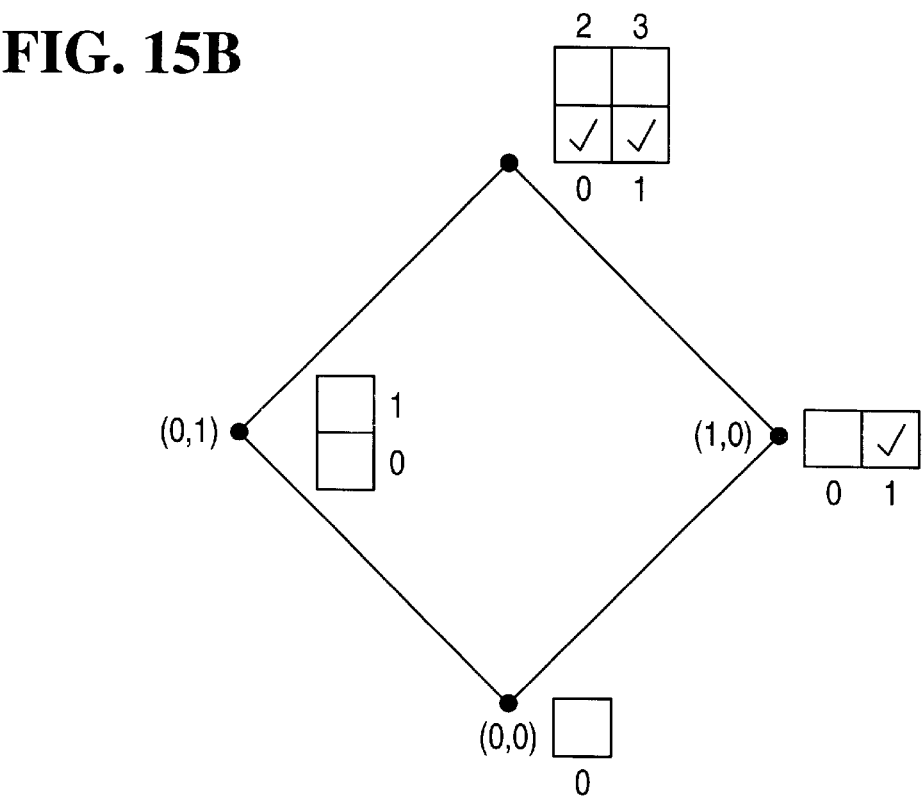

Example 6.1. In FIG. 15A, chunk 0 at level (1, 1) has a lower benefit than chunk 0 at level (1, 1) in FIG. 15B. The presence of chunk 1 at level (1, 1) in FIG. 15B leads to a higher benefit to both chunks 0 and 1, since they can now be used to compute chunk 0 at level (0, 1).

6.1 Computing Benefits

Since the benefit of a chunk is not constant, the optimal replacement policy should re-compute the benefit of a chunk whenever it is considered for replacement. However, this will make the replacement policy very expensive and is generally infeasible. As an approximation, the benefit of a chunk is set when the chunk is newly computed. The benefit is updated only when this chunk is actually used to compute another chunk (to account for the aggregation benefit). The benefit of a newly computed chunk depends on how it has been computed:

1. If it has been computed by aggregating other chunks, then its benefit is equal to the cost of this aggregation; or 2. If it has been computed at the RDBMS 106, its benefit should also incorporate the cost of connecting to the RDBMS 106, issuing a query and fetching results.

Typically, the overhead of issuing a SQL query to the RDBMS 106 and fetching the results over the network can be quite high as compared to the cost of aggregating from the cache 104. A query will run much faster if it can be completely answered by aggregating from the cache 104. Thus, chunks which get computed at the RDBMS 106 should get a higher priority while caching than those which can be computed from other chunks already in the cache 104.

6.2 Forming Groups of Chunks

The optimal replacement policy should also try to form groups of useful chunks, since having a complete group leads to higher benefit for all chunks in the group as seen in Example 6.1. This is very difficult since it amounts to predicting what chunks are going to be inserted in the future. One way to solve this problem is to pre-compute entire GROUP-BYs and cache them. Since all the chunks in the GROUP-BY are cached, they can be used to compute any chunk at a higher aggregated level. In other words, pre-computing a GROUP-BY leads to the formation of useful group of chunks. The issue here is how many GROUP-BYs to pre-compute, since a cache 104 is meant to be dynamic and not fixed statically.

Commercial systems have taken various approaches to loading and pre-computing data. Some like ORACLE EXPRESS™ and ARBOR ESSBASE™ try to pre-compute virtually everything [APB-BENCH]. This approach leads to long pre-computation times, and huge memory requirements in the middle tier. Other systems such as APPLIX TM1™ keep only the base data in main memory [TM1], which is used in the pre-computing step. This approach requires less memory, and dramatically decreases pre-computation time. Thus, these products can start answering queries before others have even finished loading. However, since even in-memory computation is not free, once the pre-computation is finished, ORACLE and ESSBASE are substantially faster.

One possible solution is a hybrid, in which a part of the base data is loaded in memory, and then higher level chunks are dynamically cached. The goal is to get the best of both worlds, i.e., limited pre-compute time, lowered memory requirements, and faster query execution time.

An important factor is the cache 104 size relative to the base data size. It might seem that the base data is generally much bigger than the cache 104 size. However, note that both the definition of "base data" and "active portion" will vary from application to application.

In many OLAP applications, the "base data" is already aggregated to some degree. For example, in a sales application for a large retailer, the customer dimension is often rolled up into some higher level segments.

With respect to the "active portion" of base data, in many cases an application will be concerned primarily with a given time window (e.g., last 12 months) or with a given scenario (e.g., actual).

The overall point is that, in practice, for OLAP applications, the "active portion of the base data" is much smaller than the biggest fact table in a large data warehouse. One can see that this is true by examining the OLAP marketplace. Currently MOLAP (multidimensional OLAP) dominates ROLAP (relational OLAP) by a wide margin, and no currently deployed MOLAP application will run on data sets the size of large data warehouse fact tables [PC].

If the cache 104 can hold all the base level chunks, all the queries can be answered from the cache 104 and there is no need to go to the RDBME 106 at all However, if the cache 104 is not big enough to hold all of the "active portion" of the base level chunks, which chunks are cached becomes important. It is not of much use if the cached chunks are distributed all over the multi-dimensional space. For example, in FIG. 15A, at level (1, 1) it is much better to cache chunks 0 and 1 rather than chunks 0 and 3. Chunks 0 and 1 can be used to compute chunk 0 at level (0, 1) whereas chunks 0 and 3 cannot be aggregated to give any higher level chunk In general, it is beneficial if a set of chunks cached form a packed region of the multi-dimensional space. The inventors experimented with different options and found that loading an entire GROUP-BY with the maximum number of descendents in the lattice and which fits in the cache 104 works well.

6.3 Two Level Policy

In accordance with experimental observations:

Chunks are classified into two types, i.e., those that are fetched from the RDBMS 106 (called backend chunks), and those that are computed from other chunks in the cache 104 (called computed chunks). Backend chunks have higher priority and can replace computed chunks, but not the other way around. This policy tries to minimize accesses to the RDBME 106 since they are expensive. Replacement within each group is according to the normal benefit policy (i.e., highly aggregated chunks have higher benefit—same as that used in [DRSN98].

Whenever a group of chunks is used to compute another chunk, the clock value provides an approximation of the LRU (least recently used) of all the chunks in the group, and is incremented by an amount equal to the benefit of the aggregated chunk This tries to identify and maintain groups of useful aggregatable chunks in the cache 104.

To help in the formation of useful groups, the cache 104 is pre-loaded with a GROUP-BY that fits in the cache 104 and has the maximum number of descendents in the lattice. Picking such a GROUP-BY will enable answering queries on any of its descendents.

Clearly, this replacement policy is not optimal, and improving on it is fertile ground for future work On the other hand, experiments show that this policy provides substantial benefits over such policies as simple benefit-based LRU.

7 Experiments

In this section, experiments used to evaluate the performance of the different schemes are described. The experiments were performed on a three-tier system.

The client issues queries to the middle tier, which caches results. Both the client and the middle tier were running on a dual processor Pentium 90 MHz machine with 128 MB of main memory running SunOS 5.5.1. The RDBMS 106 used was a commercial RDBMS, running on a separate machine (a Sun UltraSparc 200 MHz with 256 MB of main memory running SunOS 5.5.1). A buffer pool size of 30 MB was used at the RDBMS 106. The chunked file organization was achieved by building a clustered index on the chunk number for the fact file. The query execution times reported are the execution times at the middle tier.

All experiments were run on the APB-1 Schema [APB]. APB-1 is an analytical processing benchmark developed by the OLAP Council. The APB-1 schema, like any OLAP schema, consists of a set of dimensions and measures. APB has five dimensions with hierarchies. Also, there is a measure UnitSales associated with the dimensions Product, Customer, Time and Channel. This mapping is stored in a fact table HisSale. The schema is described below:

Product=(PCode, PClass, PGroup, PFamily, PLine, PDivision)

Customer=(CStore,CRetailor)

Time=(TMon, TQtr, TYr)

Channel (ChBase)

Scenario (Scenario)

HistSale (CStore, PCode, ChBase, TMon, UnitSales)

All queries were on the fact table HistSale, and asked for sum of UnitSales at different levels of aggregation. The number of nodes in the APB lattice is $(6+1)*(2+1)*(3+1)*(1+1)*(1+1)=336$, because the hierarchy sizes are 6, 2, 3, 1 and The data was generated using the APB data generator [APB], with the following parameters: number of channels= 10 and data density=0.7. The table HistSale had about a million tuples, each of 20 bytes. Adding some page overhead the base table size comes to about 22 MB. The estimated size of the full cube for this schema is 902 MB. The experiments used cache 104 sizes of 10 MB to 25 MB, which are quite small compared to the size of the full cube. The number of distinct values and number of chunk ranges at different levels of the dimensions are listed in Table 1. The total number of chunks at the base level is $8*10*4*2*1=640$.

Two kinds of experiments were performed. In order to evaluate a concept by itself, independent of the query stream generation method, a set of unit experiments were performed. For these experiments, a very precise set of input queries were used, which were designed to bring out the best case, worst case, and the average behavior. The other set of experiments involved artificially generating a query stream and comparing the performance of the different methods.

7.1 Unit Experiments

7.1.1 Benefit of Aggregation

This experiment demonstrates the benefit of implementing aggregations in the cache 104. The query stream consists of one query at each level of aggregation. Each query accesses one chunk at the corresponding level. The cache 104 was pre-loaded so that all the base table chunks are cached—level (6,3,2,1,0). In one case, aggregation in the cache 104 was not used and all the queries had to be executed at the RDBMS 106. In the other case, the queries were answered by aggregating from the base table chunks. The query execution times both at the RDBMS 106 or in the cache 104 depends on the level of aggregation.

Table 2 shows the execution times for two extremes: the most aggregated GROUP-BY level (0,0,0,0,0) and a very detailed GROUP-BY level (6,2,3,0,0). It also gives the average time over all the GROUP-BYs. The Scenario dimension is always at level 0 in all queries, since this dimension is missing from the HistSale table. Aggregating in the cache 104 is several times faster than executing the query in the RDBMS 106 for all the GROUP-BYs. This is due to the large overhead of issuing a SQL query to the RDBMS 106 and fetching results. Also, the RDBMS 106 may not be optimized for performing star joins, which are essential when rolling up along the hierarchies. On the average, aggregating in cache 104 is about 8 times faster. Note that this factor, is highly dependent on the network and the RDBMS 106 being used. The presence of pre-computed aggregates at the RDBMS 106 would also affect the results. In these experiments, there were no pre-computed tables. Pre-computed tables at the RDBMS 106 might make it necessary to have a simple optimizer which decides whether to aggregate in the cache 104 or fetch from the RDBMS 106.

7.1.2 Aggregation Cost Optimization

This experiment aims to show how aggregation costs can vary along different paths. For each GROUP-BY one chunk is computed in two ways: in one case, it is aggregated from chunks at the base level and in the second case, it is aggregated using the least cost method (from its smallest parent). The difference in these times gives an idea of the potential savings due to cost based optimization. Table 3 shows the execution times for two extremes: the most aggregated GROUP-BY—level (0,0,0,0,0) and a very detailed GROUP-BY—level (6,2,3,0,0) and also the average time over all the GROUP-BYs. For the most aggregated level (0,0,0,0,0), the ratio of the worst path to best path is the largest. A single tuple at that level results from aggregating a large number of base tuples, so computing it from base level is quite expensive. On the other hand, if it is computed from its immediate parent (which itself is highly aggregated), the cost is smaller since a smaller number tuples are aggregated. For a very detailed level like (6,2,3,0,0), there is not much difference between the best and the worst paths. However, the average speedup does suggest that cost based optimization is important.

7.1.3 Lookup Times

The complexity of the lookup algorithm to determine how to compute a chunk is different for ESM and VCM. ESM explores all paths, whereas VCM explores just a single path. In this experiment, the lookup times for all four algorithms ESM, ESMC, VCM and VCMC were measured. The lookup time for one chunk at each level of aggregation was also measured. The lookup time depends on the level of aggregation as well as on the cache 104 contents. Table 4 lists the minimum, maximum and the average lookup times over all the GROUP-BYs for two cases: one where the experiment was run with an empty cache 104 and the other where the cache 104 was warmed up with all the base table chunks.

In both cases, the cache 104 lookup times for VCM and VCMC are negligible. These methods explore a maximum of one path. The times for the ESM and ESMC are more interesting. When the cache 104 is empty, none of the paths will be successful. However, both these methods have to explore all the paths. Lemma 3.1 suggests that the time depends on the level of aggregation of the GROUP-BY. For detailed level GROUP-BYs, the lookup time is low since very few paths of computations exist. For aggregated GROUP-BYs, the time is much higher due to explosion in the number of paths. This variation is one of the drawbacks of the exhaustive methods, since query response time will no longer be consistent. VCM and VCMC do not have these problems.

When all the base table chunks are in the cache 104, lookup times for ESM becomes negligible, since the very first path it explores becomes successful (base table makes all paths successful. However, it is very likely that the first path (from the base table) is not the best path. For ESMC, the lookup time is unreasonable when all the base level chunks are cached, since ESMC has to explore all the paths, to find the best cost path. The cost of each path itself becomes much higher, since each chunk on each path is computable and the ESMC is called recursively on it. This fan-out factor (one chunk at a particular level maps to a set of chunks at a more detail level) was ignored in estimating the complexity of the lookup. Even a savings in aggregation costs cannot justify such high lookup times. The ESMC method was not considered in any further experiments. There is a small difference in the find times for ESM, VCM and VCMC, even though all three explore only one path. The time for VCM and VCMC are slightly higher because of the overhead of additional array lookups.

7.1.4 Update Times

The VCM and VCMC incur an update cost while inserting and deleting chunks, since they have to maintain count and cost information. ESM and ESMC do not have any update cost. Lemma 4.1 suggests that update complexity is higher for more detail level chunks. To look at the worst case behavior, all chunks of the base table were loaded—level (6,2,3,1,0) followed by all chunks at level (6,2,3,0,0). The update times vary while inserting different chunks, since how far an update propagates depends on what has been inserted in the cache 104 previously. For example, while inserting the last chunk at level (6,2,3,1,0), the update propagates all the way, since a lot of aggregate chunks become computable because of it. Table 5 shows the maximum, minimum and the average update time for the VCM and VCMC Even the maximum update time is quite feasible and on an average the cost is negligible.

An interesting difference was observed between VCM and VCMC. When inserting chunks at level (6,2,3,0,0), the update times for VCM are 0. All the chunks are already computable due to previous loading of level (6,3,3,1,0), so the updates do not propagate at all. However, for VCMC, insertion of chunks of (6,2,3,0,0) changes the cost of computation for all its descendents in the lattice. The cost information needs to be changed and the update costs reflects this.

7.1.5 Space Overhead

The improved performance of VCM and VCMC comes at the expense of additional memory required for the Count, Cost and BestParent arrays. The number of array entries is equal to total number of chunks at all possible levels. This might seem large, but it is feasible due to the following reasons:

1. If a chunk is not computable, its count is 0. If a sparse array representation is used, the amount of storage becomes proportional to the number of chunks computable from the cache 104 rather than the total number of possible chunks. In this implementation, a dynamic representation is used, which switches between a sparse and a dense representation.

2. The number of chunks is much smaller than the actual number of tuples in the base table. For example, in the schema used for the experiments, the base table had one million tuples of 20 bytes each. The total number of chunks over all the levels is 32256.

Table 6 shows the maximum space overhead for the different methods assuming 4 bytes to store the cost and 1 byte each for the count and BestParent. Even for VCMC, the maximum overhead is quite small (about 0.97%) compared to the base table size. Space overhead can be expected to scale linearly with the database size, since the number of chunks typically increases linearly assuming the average chunk size is maintained.

7.2 Query Stream Experiments

For these experiments, a stream of queries was generated using different parameters. These were similar to the ones used in [DRSN98]. For each experiment, the cache 104 was pre-loaded with a GROUP-BY as the "two-level policy". Performance is measured as an average over 100 queries. The cache 104 sizes used ranged from 10 MB to 25 MB. This might seem high as compared to a base table size of 22 MB. But, as noted earlier (section 6.2), very often in OLAP applications, the "active portion" of the base table is not as large as the biggest table in the data warehouse. Also, it is important to note that the query stream is really over the entire "cube", not just the base table. The cube size is 902 MB, so the caches 104 are small as compared to the data set being cached.

7.2.1 Generating a Query Stream

The query stream is a mix of four kinds of queries:

1. Random Queries: This query is generated by choosing an aggregation level (GROUP-BY) randomly over the lattice with uniform distribution. Similarly, the selection predicate is chosen uniformly and randomly for each dimension.
2. Drill Down Queries: The query generated a drill-down over the previous query, i.e., the level of detail is increased in one of the dimensions. The selection predicate is adjusted accordingly.
3. Roll Up Queries: This is complement of drill down query, in which the new query rolls up on one of the dimensions to a greater level of aggregation.
4. Overlap queries: The query generated is at the same level as the previous query. The selection predicate is changed and it may partially overlap with the previous selection range.

Roll-up, drill-down and overlap queries give rise to some locality in the query stream. While traditional caching can exploit overlap locality, active caches 104 with aggregation are needed to improve performance of roll-up queries. The query stream used had a mix of 30% each of drill-down, roll-up and overlap queries; the rest of them (10%) were random queries.

This experiment was designed to compare the "two level policy" described in Section 6 with the plain benefit based policy. The plain benefit based policy does not classify chunks into two types. Also, no attempt is made to identify groups of chunk.

Figure 16:
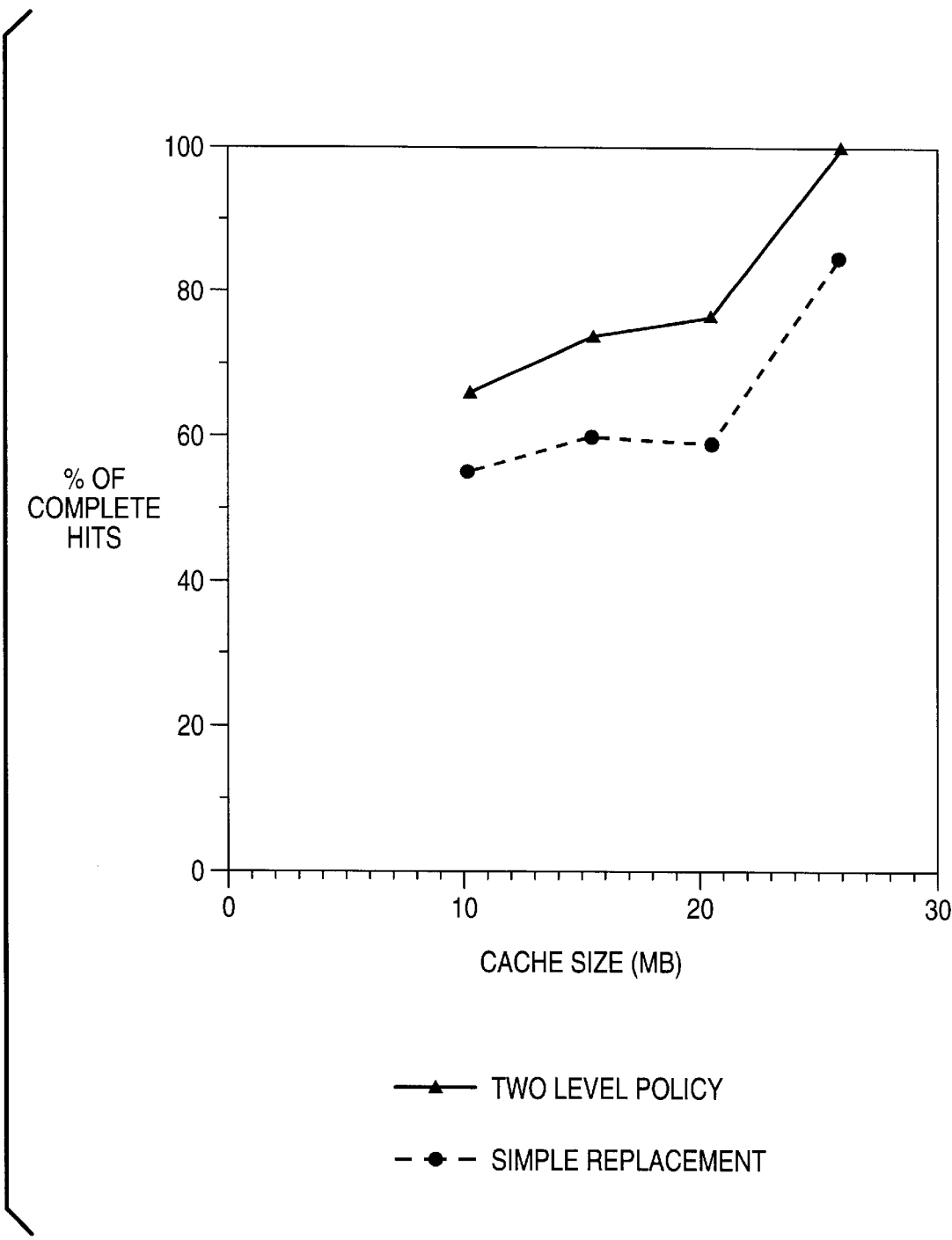
FIG. 16 plots the percentage of queries which are complete hits in the cache for different cache sizes.

FIG. 16 plots the percentage of queries which are complete hits in the cache 104 for different cache 104 sizes. By "complete hits", it is meant queries that are completely answered from the cache 104, either directly or by aggregating other chunks.

Figure 17:
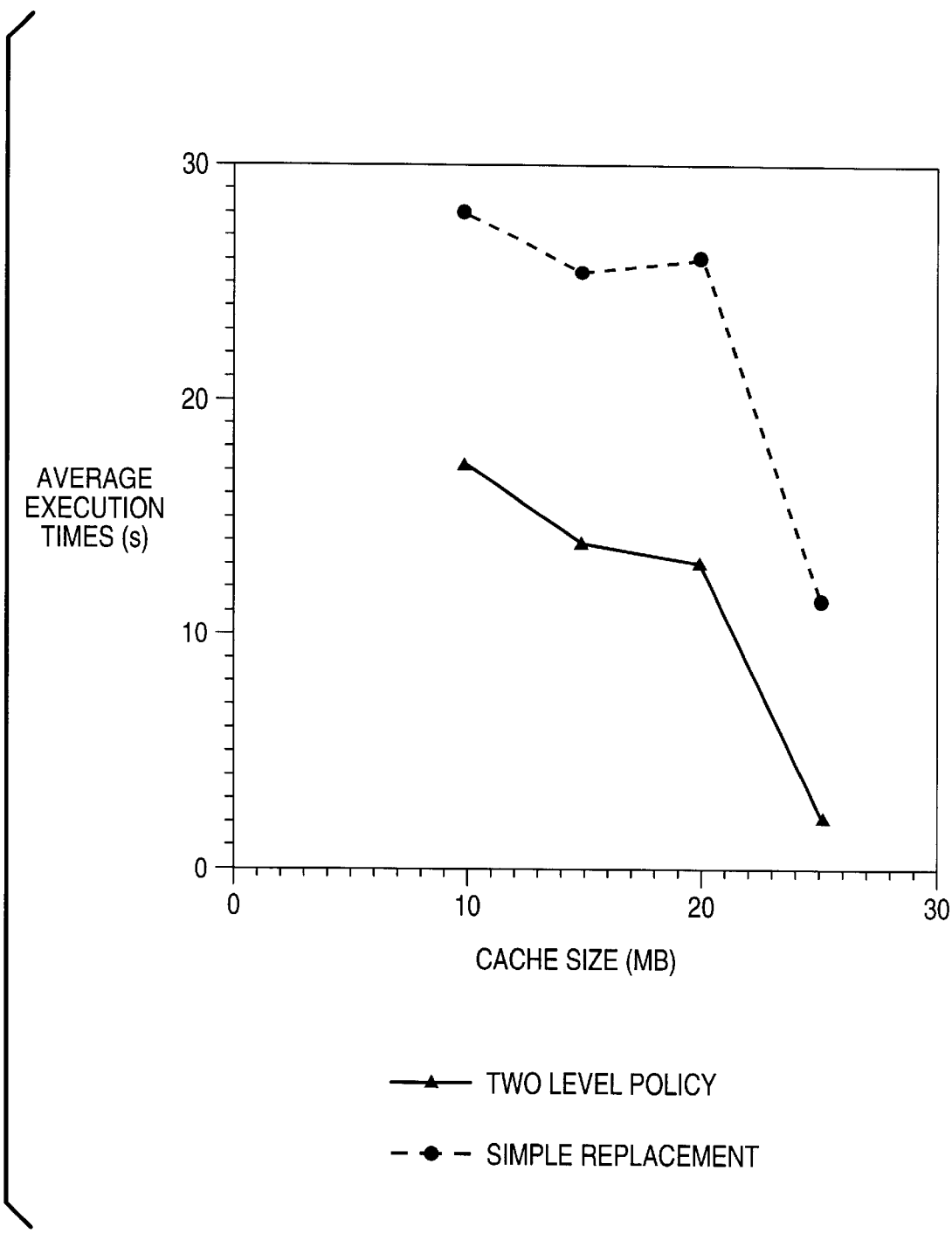
FIG. 17 plots the average query execution times.

The average query execution times are plotted in FIG. 17. As the cache 104 size increases, the percentage of complete hits increases. There are two reasons: the cache 104 can be pre-loaded with a larger GROUP-BY (so more queries can be answered by aggregating) and just more chunks are cached leading to better hit ratio in general.

The results show that the "two level policy" performs better because it has a better complete hit ratio. Also, for queries which are not complete hits, a larger portion of the results are found in the cache 104 leading to a smaller query being issued to the RDBMS 106. This translates into improved average response time.

For example, consider the case when the cache 104 is large enough (25 MB) to hold the entire base table. The "two level policy" caches the entire base table, leading to 100% complete hit ratio. The ratio is lower for the other case (since it throws away useful base chunks in favor of computed chunks), causing it to go to the RDBMS 106 for some queries.

7.2.3 Comparison of Different Schemes

Figure 18:
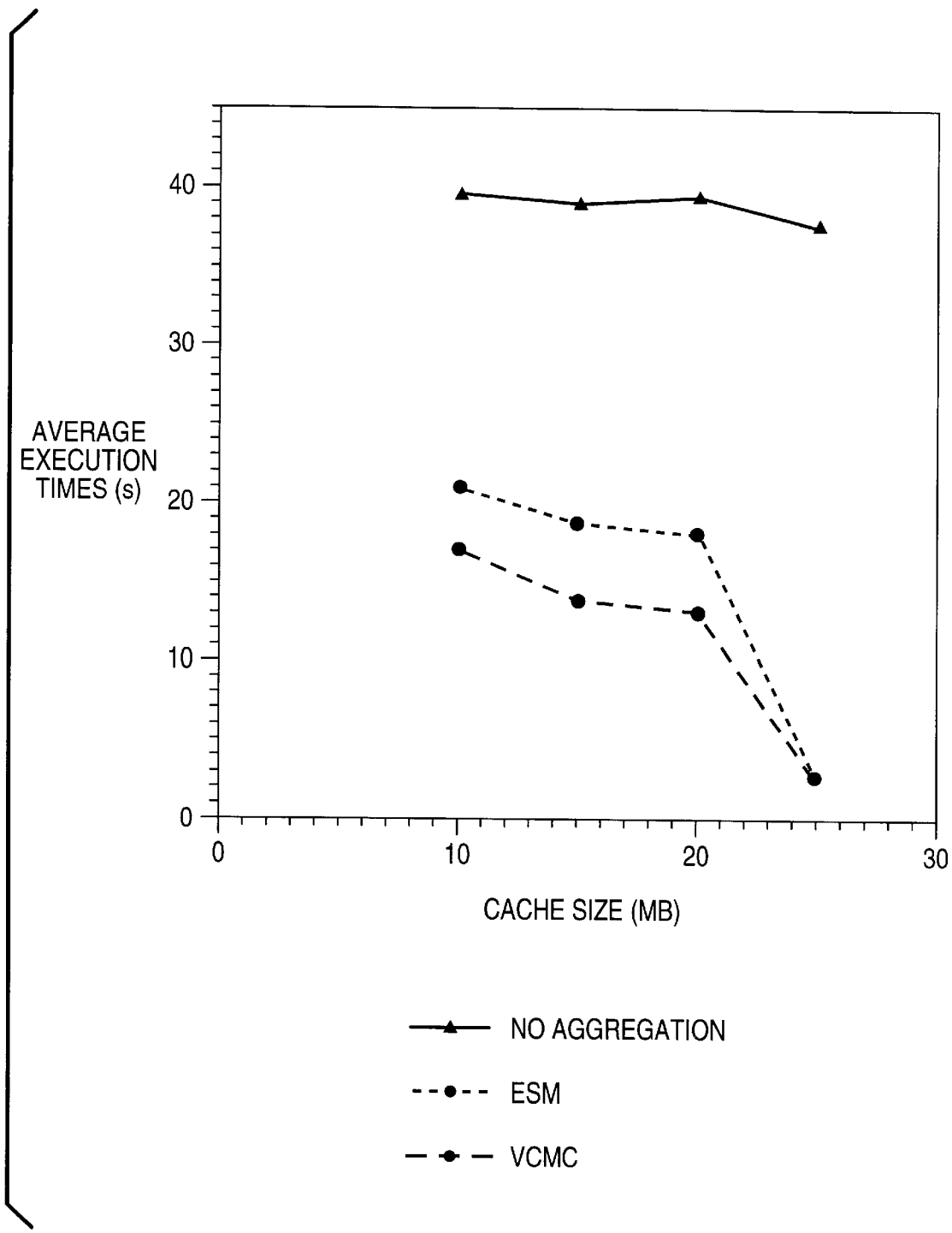
FIG. 18 shows the average execution times for running the query stream in a comparison of ESM and VCMC with no aggregation.

In this experiment, different approaches to caching are compared: no aggregation, exhaustive search based methods, and virtual count based methods. Experiments in Section 7.1 showed that the lookup times for ESMC are unreasonable. Also, the lookup and update costs of VCMC are comparable to that of VCM. So, only ESM and VCMC are considered. The case with no aggregations in the cache 104 is considered to demonstrate the benefit of having an active cache 104. FIG. 18 shows the average execution times for running the query stream described earlier. The "two level policy" was used for replacement for ESM and VCMC However, for the "no aggregation" case, the simple benefit based policy was used, since detail chunks do not have any higher benefit in the absence of aggregation. Both ESM and VCMC outperform the "no aggregation" case by a huge margin. This is expected, since, without aggregation, the number of cache 104 misses are large. In fact, only 31 out of the 100 queries are complete hits in the cache 104. For ESM and VCMC, the number of complete hits are much more.

VCMC outperforms ESM, with the difference being more for lower cache 104 sizes. It might seem that the difference is not large. However, this is because of the fact that the average execution times are plotted over all the queries. The queries which have to go the RDBMS 106 take disproportionately larger time and that affects the average. The difference between VCMC and ESM is more pronounced for queries which are complete hits. When the query stream has lot of locality, many complete hits can be expected. Therefore, speeding up complete hit queries is critical for increased system throughput. Table 7 shows the percentage of queries that are complete hits and the speedup factor for these queries.

Figure 19:
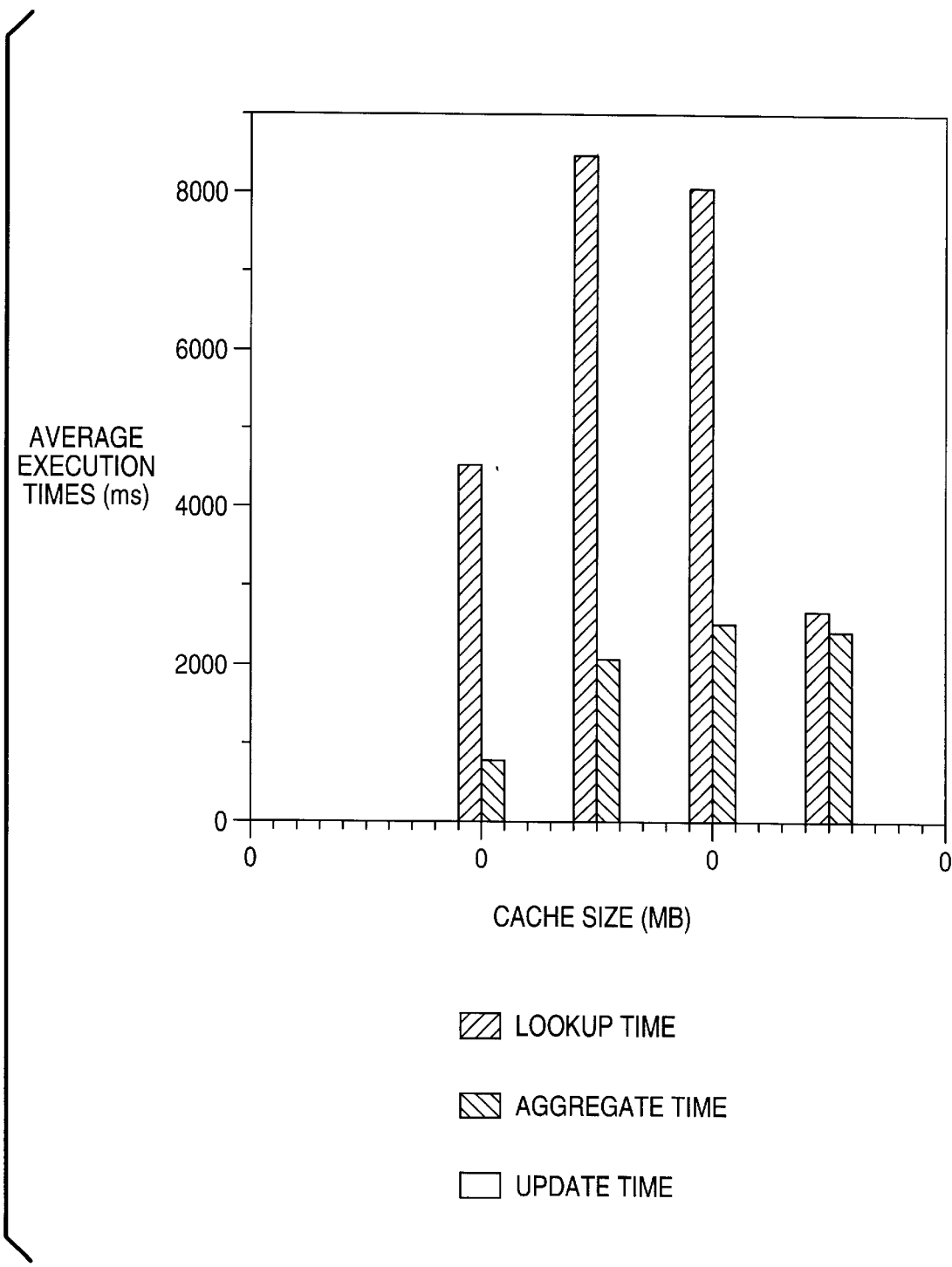
FIG. 19 shows the average execution times for running queries that are complete hits in the cache in a comparison of ESM and VCMC with no aggregation.

To further analyze the speedup, FIG. 19 shows the average execution times for queries that hit completely in the cache 104. The total cost for each query is split into three parts: cache 104 lookup time, aggregation time and update time (to add the newly computed chunks). The bars on the left are for ESM and those on the right are for VCMC. Even though it seems that the execution times are increasing for larger caches 104, note that the times cannot be compared across different cache 104 sizes. This is because the set of queries that are complete hits is different for different cache 104 sizes. At lower cache 104 sizes, the speedup is more. This is because for smaller caches 104, the cache 104 cannot hold a lot of chunks. Therefore, ESM has to spend a lot of time in finding a successful path of computation. This is reflected in very high lookup times.

There is also a difference in the aggregation costs for ESM and VCMC, since VCMC considers costs to find the best path of computation. As the cache 104 size is increased, the lookup time for ESM reduces, since there are more successful paths. In fact, for a cache 104 size of 25 MB, the entire base table fits in memory and the first path it searches is a successful path. So, the find time becomes negligible. The performance difference is now only due to the difference in the aggregation cost.

It can also be observed that the update times for VCMC are very small. The update times, for a cache 104 size of 25 MB, are slightly higher since it holds all the base level chunks. Whenever a new aggregated chunk is added or removed, it changes the costs of computation for its descendent chunks and these costs have to be updated. The search times for VCMC are negligible.

7.3 Discussion

The experiments have shown that aggregation in the cache 104 is a good idea and leads to a dramatic improvement in performance over the no aggregation case. The "two-level" policy works better than the simple benefit policy, since it maintains useful groups of chunks and reduces accesses to backend. VCMC always performs better than ESM. When the cache 104 size is small compared to the base (or "active" data size), the win of VCMC over ESM is more pronounced. A large part of this gain is due to savings in the find time and a smaller one due to aggregation time. When the cache 104 is big enough to hold all base data and some more aggregated chunks, the gain in the find time is lost (since the first path chosen by ESM is successful). The improvement is now only due to the aggregation cost. Even though it has been shown that the potential savings in aggregation cost could be high (by the unit experiments), it turns out that, on average over all the GROUP-BYs and for the queries generated, the savings in aggregation cost are not that high. So, in this case, a choice can be made of using either ESM or VCMC depending on the locality in the query stream and the implementation effort one is willing to put in.

8 Conclusions

Providing a cache 104 with the "active" capability of computing aggregates from cached data allows the cache 104 to satisfy queries that would otherwise result in cache 104 misses. Results from the present invention show that this can yield a substantial performance improvement over traditional caching strategies. Providing this improvement requires the development of fast mechanisms for determining when a query can be computed from the cache 104. Also, given that a query can, in fact, be computed from the cache 104, fast mechanisms are required for determining the optimal aggregation path given the current state of the cache 104 and the current query.

The area of active caching opens up a lot of opportunities for future work. One direction for such work would be to investigate the efficacy of such active caching approaches in workloads more general than those typically encountered in OLAP applications. The solution provided here takes advantage of the clean hierarchical structure of multidimensional data models and queries; it may be a challenging task to develop similar techniques for less structured workloads.

There are also many interesting open issues for active caching for multidimensional workloads. One of the most interesting is that of cache 104 replacement policies, since the utility of data in a cache 104 now varies dramatically depending upon (a) where the data is in the hierarchy, and (b) what other data are currently in the cache 104.

At some point, the cache 104 itself begins to resemble a database system, with its own query processor and optimizer. There are interesting tradeoffs to be made here. For example, the more complex the active cache 104 becomes, the higher the overhead it is likely to impose. Replacing a cache 104 with a middle tier RDBME 106 is likely to give rise to the need for yet another cache 104 to speed up access to this middle tier RDBMS 106, which begs the question once again of how complex that cache 104 should be. Ignoring the issue of overhead, another difference between a middle tier RDBMS 106 and an active cache 104 is that the cache 104 contains a workload sensitive dynamically varying subset of the data being accessed. This can be a significant benefit, allowing, for example, a "hot" segment of detailed data to be cached in the middle tier, even when the entire database is far too large to be loaded into the middle tier.

9 References

[AAD+96] S. Agarwal, R. Agrawal, P. M. Deshpande, A. Gupta, U. Naughton, R. Ramakrishnan, S. Sarawagi. On the Computation of Multidimensional Aggregates, Proc. of the 22nd Int. VLDB Conf., 506–521, 1996.

[APB] The Analytical Processing Benchmark available at http://vww.olapcouncil.org/research/bmarkly.htm

[APB-BENCH] APB benchmark performance results available at http://www.oracle.com/olap/html/bnchmark.html, http://www.hyperion.com/unix-hench.cfm.

[BPT97] E. Baralis, S. Paraboschi, E. Teniente. Materialized View Selection in a Multidimensional Database, Proc. of the 23rd Int. VLDB Conf., 1997.

[DFJST] S. Dar, M. J. Franklin, B. T. Jonsson, D. Srivastava, M. Tan. Semantic Data Caching and Replacement, Proc. of the 22nd Int. VLDB Conf., 1996.

[DRSN98] P. M. Deshpande, K. Ramasamy, A. Shukla, J. F. Naughton. Caching Multidimensional Queries Using Chunks, Proc of ACM SIGMOD Int., Conf. on Mgmt. of Data, 259–270, 1998.

[GBLP96] J. Gray, A. Bosworth, A. Layman, H. Pirahesh. Data Cube: A Relational Aggregation Operator Generalizing GroupBy, Cross-Tab, and Sub-Totals, Proc. of the 12th Int. Conf. on Data Engg., pp. 152–159, 1996.

[GHRU97] H. Gupta, V. Harinarayan, A. Rajaraman, J. D. Ullman. Index Selection for OLAP, Proc. of the 13th ICDE, 208–219, 1997.

[G97] H. Gupta. Selection of Views to Materialize in a Data Warehouse, Proc. of the Sixth ICDT, 98–112, 1997.

[HRU96] V. Harinarayanan, A. Rajaraman, J. D. Ullman. Implementing Data Cubes Efficiently, Proc. ACM SIGMOD Int. Conf. on Management of Data, 205–227, 1996.

[KR98] Y. Kotidis, N. Roussopoulos. An Alternative Storage Organization for ROLAP Aggregate Views Based on Cubetrees, Proc. ACM SIGMOD Int. Conf on Management of Data, 249–258, 1998.

[KR99] Y. Kotidis, N. Roussopoulos. DynaMat: A Dynamic View Management System for Data Warehouses Proc. ACM SIGMOD Int. Conf on Management of Data, 371–382, 1999.

[PC] N. Pendse, R. Creeth. The OLAP Report available at http://vww.olapreport.com.

[RKR97] N. Roussopoulos, Y. Kotidis, M. Roussopoulos. Cubetree: Organization of and Bulk Updates on the Data Cube, Proc. ACM SIGMOD Int. Conf. on Management of Data, 89–99, 1997.

[RK96] R. Kimball. The Data Warehouse Toolkit, John Wiley & Sons, 1996.

[RSC98] K. A. Ross, D. Srivastava, D. Chatziantoniou. Complex Aggregation at Multiple Granularities, Int. Conf. on Extending Database Technology, 263–277, 1998.

[RS97] K. A. Ross, D. Srivastava. Fast Computation of Sparse Datacubes, Proc. of the 23rd Intl. VLDB Conf., 116–125, 1997.

[SDJL96] D. Srivastava, S. Dar, H. V, Jagadish and A. Y Levy. Answering Queries with Aggregation Using Views, Proc. of the 22nd Int. VLDB Conf., 1996.

[SDNR96] A. Shukla, P. M. Deshpande, J. F. Naughton. K. Ramasamy, Storage Estimation for Multidimensional Aggregates in the Presence of Hierarchies, Proc. of the 22nd Int. VLDB Conf, 522–531, 1996.

[SDN98] A. Shukla, R. M. Deshpande, J. F. Naughton. Materialized View Selection for Multidimensional Datasets, Proc. of the 24th Int. VLDB Conf., 488–499, 1998.

[SLCJ98] J. R. Smith, C. Li, V. Castelli, A. Jhingran. Dynamic Assembly of Views in Data Cubes, Proc. of the 17th Sym. on PODS, 274–283, 1998.

[SSV] P. Scheuermann, J. Shim and R. Vingralek. WATCHMAN: A Data Warehouse Intelligent Manager, Proc. of the $22^{nd}$ Int. VLDB Conf, 1996.

[SS94] S. Sarawagi and M. Stonebraker. Efficient Organization of Large Multidimensional Arrays, Proc. of the 11th Int. Conf. on Data Engg., 1994.

[TMI] TMI technology papers available at http://www.applix.com/tm1/tm/tm_tech.html, http://www.applix.com/tm1/rescentr/tm1wppr.htm.

[U96] J. D. Ullman. Efficient Implementation of Data Cubes Via Materialized Views, The 2nd Int. Conf. on Knowledge Discovery and Data Mining, 386–388, 1996.

[ZDN97] Y. Zhao, P. M. Deshpande, J. F. Naughton. An Array-Based Algorithm for Simultaneous Multidimensional Aggregates, Proc. ACM SIGMOD Int. Conf. on Management of Data, 159–170, 1997.

Conclusion

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a method, apparatus, and article of manufacture for caching multi-dimensional data sets for an on-line analytical processing (OLAP) system. An "active cache" is used, wherein the cache can not only answer queries that match data stored in the cache, but can also answer queries that require aggregation or other computation of the data stored in the cache.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for caching multi-dimensional data sets for an on-line analytical processing (OLAP) system, comprising:

(a) accessing multi-dimensional data from a relational database management system (RDBMS) in order to answer at least a portion of a first query;

(b) storing the multi-dimensional data in a cache;

(c) determining whether it is possible to answer at least a portion of a second query by aggregating the multi-dimensional data stored in the cache; and (d) aggregating the multi-dimensional data stored in the cache in order to answer at least the portion of the second query, when it is has been determined that it is possible to answer at least the portion of the second portion by aggregating the multi-dimensional data stored in the cache.

2. The method of claim 1, wherein the cache is an active cache.

3. The method of claim 1, wherein the relational database management system maintains the multi-dimensional data in an unaggregated form.

4. The method of claim 1, wherein the multi-dimensional data is aggregated in response to the first query and the aggregated data is stored in the cache.

5. The method of claim 1, wherein the aggregating step further comprises:

selecting from among a plurality of aggregation paths to answer the portion of the second query after it has been determined that it is possible to answer the portion of the second query by aggregating the multi-dimensional data stored in the cache.

6. An on-line analytical processing (OLAP) system that caches multi-dimensional data sets, comprising:

(a) a computer system;

(b) logic, performed by the computer system, for:

(1) accessing multi-dimensional data from a relational database management system (PDBMS) in order to answer at least a portion of a first query;

(2) storing the multi-dimensional data in a cache;

(3) determining whether it is possible to answer at least a portion of a second query by aggregating the multi-dimensional data stored in the cache; and (4) aggregating the multi-dimensional data stored in the cache in order to answer at least the portion of the second query, when it is has been determined that it is possible to answer at least the portion of the second portion by aggregating the multi-dimensional data stored in the cache.

7. The system of claim 6, wherein the cache is an active cache.

8. The system of claim 6, wherein the relational database management system maintains the multi-dimensional data in an unaggregated form.

9. The system of claim 6, wherein the multi-dimensional data is aggregated in response to the first query and the aggregated data is stored in the cache.

10. The system of claim 9, wherein the logic for aggregating further comprises logic for:

selecting from among a plurality of aggregation paths to answer the portion of the second query after it has been determined that it is possible to answer the portion of the second query by aggregating the multi-dimensional data stored in the cache.

11. An article of manufacture embodying logic for caching multi-dimensional data sets for an on-line analytical processing (OLAP) system comprising:

(a) accessing multi-dimensional data from a relational database management system RDBMS) in order to answer at least a portion of a first query;

(b) storing the multi-dimensional data in a cache;

(c) determining whether it is possible to answer at least a portion of a second query by aggregating the multi-dimensional data stored in the cache; and (d) aggregating the multi-dimensional data stored in the cache in order to answer at least the portion of the second query, when it is has been determined that it is possible to answer at least the portion of the second portion by aggregating the multi-dimensional data stored in the cache.

12. The article of manufacture of claim 11, wherein the cache is an active cache.

13. The article of manufacture of claim 11, wherein the relational database management system maintains the multi-dimensional data in an unaggregated form.

14. The article of manufacture of claim 11, wherein the multi-dimensional data is aggregated in response to the first query and the aggregated data is stored in the cache.

15. The article of manufacture of claim 11, wherein the aggregating step further comprises:

selecting from among a plurality of aggregation paths to answer the portion of the second query after it has been determined that it is possible to answer the portion of the second query by aggregating the multi-dimensional data stored in the cache.

* * * * *

UNITED STATES PATENT AND TRADEMARK OFFICE
CERTIFICATE OF CORRECTION

PATENT NO. : 6,601,062 B1
DATED : July 29, 2003
INVENTOR(S) : Deshpande, M., Ramasamy, K., Shukla, A., and Naughton, J. F.

It is certified that error appears in the above-identified patent and that said Letters Patent is hereby corrected as shown below:

Column 1,
Line 11, delete "09/605,203" and insert -- 09/605,202 --

Column 28,
Line 31, delete "(PDBMS)" and insert -- (RDBMS) --
Line 62, delete "RDBMS)" and insert -- (RDBMS) --

Signed and Sealed this

Twenty-fifth Day of January, 2005

JON W. DUDAS
*Director of the United States Patent and Trademark Office*